United States Patent
Dell' Anna

(10) Patent No.: US 11,678,085 B2
(45) Date of Patent: Jun. 13, 2023

(54) DATA COMPRESSION METHOD, DATA COMPRESSION DEVICE, SOLID-STATE IMAGING DEVICE, DATA DECOMPRESSION DEVICE AND ELECTRONIC SYSTEM

(71) Applicant: Sony Semiconductor Solutions Corporation, Kanagawa (JP)

(72) Inventor: Francesco Dell' Anna, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/521,899

(22) Filed: Nov. 9, 2021

(65) Prior Publication Data
US 2022/0159207 A1 May 19, 2022

(30) Foreign Application Priority Data
Nov. 16, 2020 (EP) .................................. 20207799

(51) Int. Cl.
*H04N 5/378* (2011.01)
*G06T 9/00* (2006.01)

(52) U.S. Cl.
CPC ............. *H04N 5/378* (2013.01); *G06T 9/00* (2013.01)

(58) Field of Classification Search
CPC ...... H04N 5/378; H04N 19/13; H04N 19/167; H04N 19/184; H04N 19/42; G06T 9/00
See application file for complete search history.

(56) References Cited

U.S. PATENT DOCUMENTS

2004/0096122 A1 * 5/2004 Curry ................ H04N 1/40062
  382/302
2005/0276496 A1 * 12/2005 Molgaard ............ H04N 19/105
  375/E7.265

(Continued)

FOREIGN PATENT DOCUMENTS

WO    WO-0004721 A1 *  1/2000  ........... H04N 19/127

OTHER PUBLICATIONS

Hussain et al., "Efficient Deep Neural Network for Digital Image Compression Employing Rectified Linear Neurons", Journal of Sensors, Available Online At: http://dx.doi.org/10.1155/2016/3184840, vol. 2016, Article ID 3184840, 7 pages.

*Primary Examiner* — Nhan T Tran
(74) *Attorney, Agent, or Firm* — Xsensus LLP

(57) ABSTRACT

A raw binary number (401) includes a first predefined number n1 of bits, wherein each bit represents either zero or $2^{(n-1)}$ with n representing a position of the bit in the binary number and $1 \le n \le n1$. In the raw binary number a position of a highest-weighted bit unequal zero is identified. By using a first electronic circuit (491), binary position information is generated by encoding the identified position. An encoded binary number is compiled, wherein the encoded binary number is based on the binary position information and on a partial binary number. The partial binary number is a portion of the raw binary number directly following the highest-weighted bit unequal zero. The encoded binary number includes a second predefined number m1 of bits. The second predefined number m1 of bits is smaller than the first predefined number n1 of bits.

15 Claims, 26 Drawing Sheets

(56) References Cited

U.S. PATENT DOCUMENTS

| | | | |
|---|---|---|---|
| 2007/0165713 A1* | 7/2007 | Van Der Vleuten | H04N 19/34 375/E7.184 |
| 2011/0052052 A1* | 3/2011 | Hayashi | H04N 19/194 382/166 |
| 2016/0239265 A1* | 8/2016 | Duong | H03M 7/24 |

* cited by examiner

| pos(hsb) | binary position information (bpi) | dec(bpi) | #bits(bpi) |
|---|---|---|---|
|  |  |  |  |
| 24 | 111111 | 63 | 6 |
| 23 | 111110 | 62 | 6 |
| 22 | 111101 | 61 | 6 |
| 21 | 111100 | 60 | 6 |
| 20 | 111011 | 59 | 6 |
| 19 | 111010 | 58 | 6 |
| 18 | 111001 | 57 | 6 |
| 17 | 111000 | 56 | 6 |
| 16 | 11011 | 27 | 5 |
| 15 | 11010 | 26 | 5 |
| 14 | 1100 | 12 | 4 |
| 13 | 101 | 5 | 3 |
| 12 | 100 | 4 | 3 |
| 11 | 01 | 1 | 2 |
| 10 | 001 | 1 | 3 |
| 9 | 0001 | 1 | 4 |
| 8 | 00001 | 1 | 5 |
| 7 | 000001 | 1 | 6 |
| 6 | 0000001 | 1 | 7 |
| 5 | 00000001 | 1 | 8 |
| 4 | 000000001 | 1 | 9 |
| 3 | 0000000001 | 1 | 10 |
| 2 | 00000000001 | 1 | 11 |
| 1 | 000000000001 | 1 | 12 |
|  |  |  |  |
| (0) | 000000000000 | 0 | 12 |

FIG. 9
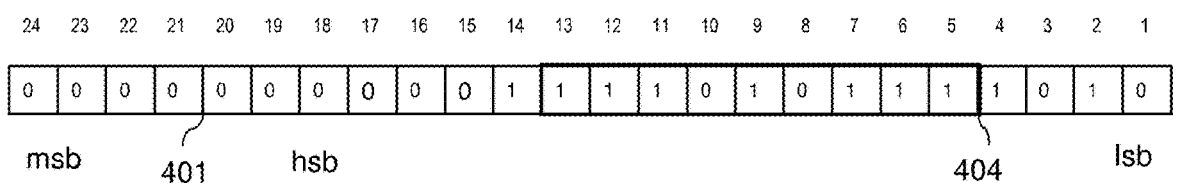
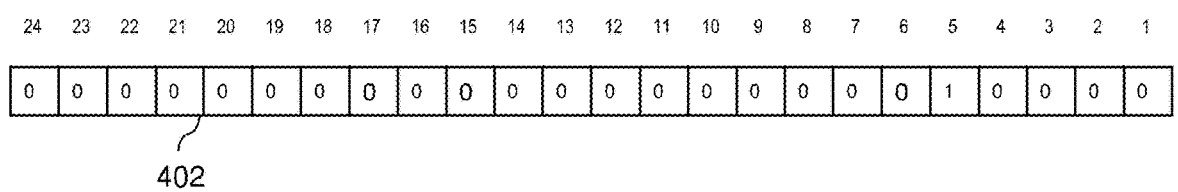
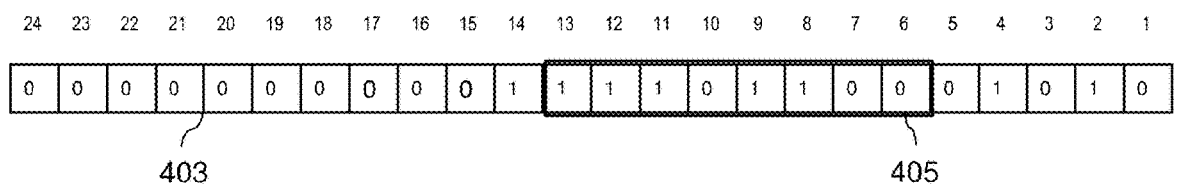
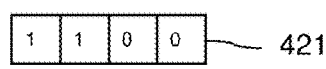
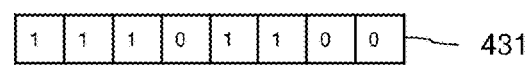
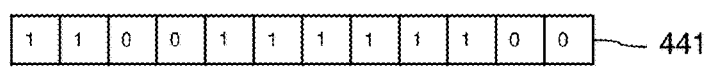

DATA COMPRESSION METHOD, DATA COMPRESSION DEVICE, SOLID-STATE IMAGING DEVICE, DATA DECOMPRESSION DEVICE AND ELECTRONIC SYSTEM

CROSS-REFERENCE TO RELATED APPLICATION

This application claims priority to European Application No. 20207799.6, filed Nov. 16, 2020, the entire contents of which are incorporated herein by reference.

TECHNICAL FIELD

The present disclosure relates to a data compression method, for example to a method compressing image data. The present disclosure further relates to a data compression device, for example to a solid state imaging device outputting compressed data and to an electronic system using data compression for data transfer.

BACKGROUND

In recent years, new types of CMOS (complementary metal-oxide semiconductor) image sensors have received attention as alternative for CCDs (charge coupled devices).

The CMOS image sensor includes one FD (Floating Diffusion) amplifier for each pixel. The pixels are arranged in an array of pixels along rows and columns. For outputting the pixel output signal, a pixel signal reading circuit of the CMOS image sensor selects one of the rows of the pixel array and simultaneously reads out all pixels in the selected row in a column direction.

A pixel signal reading circuit of the CMOS image sensor typically includes one analog-to-digital converter (hereinafter referred to as an ADC) for each row of the pixel array. The ADC successively converts the analogue pixel output signals of each pixel in the row into respective digital pixel data.

A CMOS image sensor using frame-based encoding outputs the digital pixels data for each pixel in the pixel array through a data link to a data processing unit for further usage such as storing, automated image analysis, computer vision, and/or image reproduction at a graphical interface.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

Today, sensors are increasingly integrated in a multitude of battery-powered application systems, in which at least temporarily low power consumption and/or low transmission bandwidth for the data transmitted from the sensor is of high interest. In particular solid-state imaging devices are integrated in a multitude of battery-powered application systems, e.g. electric vehicles, in which low power consumption of the sensor and/or low transmission bandwidth for the data transmitted from the sensor is of high interest.

The present disclosure has been made in view of the above circumstances, and it is therefore desirable to provide a data compression method, a data decompression method, a data compression device, a solid-state imaging device, and a data decompression device with low power consumption.

According to an embodiment a data compression method includes receiving a raw binary number, wherein the raw binary number includes a first predefined number n1 of bits, each bit representing either zero or $2^{(n-1)}$ with n representing a position of the bit in the binary number and $1 \leq n \leq n1$. In the raw binary number, a position of a highest-weighted bit unequal zero is identified. By using a first electronic circuit, binary position information is generated by encoding the identified position. An encoded binary number is compiled, wherein the encoded binary number is based on the binary position information and on a partial binary number being a portion of the raw binary number directly following the highest-weighted bit unequal zero. The encoded binary number includes a second predefined number m1 of bits, wherein the second predefined number m1 of bits is smaller than the first predefined number n1 of bits.

According to another embodiment a data decompression method includes receiving an encoded binary number with a second predefined number m1 of bits, wherein the encoded binary number includes a binary value and binary position information of variable length. In the encoded binary number, the binary position information and the binary value are identified. By using a second electronic circuit, a target position is obtained from the binary position information. A decoded binary number is compiled, wherein the decoded binary number includes a first predefined number n1 of bits, wherein the decoded binary number includes a highest-weighted bit unequal to zero at the target position and wherein at bit positions following the target position the binary value follows.

According to another embodiment a data compression device includes means for receiving a raw binary number that includes a first predefined number n1 of bits, each bit representing either zero or $2^{(n-1)}$ with n representing a position of the bit in the binary number and $1 \leq n \leq n1$. The data compression device further includes means for identifying, in the raw binary number, a position of a highest-weighted bit unequal zero. A first electronic circuit is configured to encode the identified position to obtain binary position information. The data compression device further includes means for compiling an encoded binary number, wherein the encoded binary is based on the binary position information and on a partial binary number being a portion of the raw binary number directly following the highest-weighted bit unequal zero. The encoded binary number includes a second predefined number of bits m1, wherein the second predefined number m1 of bits is smaller than the first predefined number n1 of bits.

According to another embodiment a solid-state imaging device includes a pixel array unit, an analog-to-digital converter and a data decompression device. The pixel array unit includes a plurality of pixel circuits arranged in matrix form, wherein the pixel circuits are configured to perform photoelectric conversion. The analog-to-digital converter is configured to convert an electric signal corresponding to a charge obtained by the photoelectric conversion in the pixel circuit into digital pixel data. The data compression device includes means for receiving a raw binary number that includes a first predefined number n1 of bits, each bit representing either zero or $2^{(n-1)}$ with n representing a position of the bit in the binary number and $1 \leq n \leq n1$. The data compression device further includes means for identifying, in the raw binary number, a position of a highest-weighted bit unequal zero. A first electronic circuit is configured to encode the identified position to obtain binary position information. The data compression device further includes means for compiling an encoded binary number, wherein the encoded binary is based on the binary position information and on a partial binary number being a portion of the raw binary number directly following the highest-weighted bit unequal zero. The encoded binary number includes a second predefined number of bits m1, wherein the second predefined number m1 of bits is smaller than the first predefined number n1 of bits.

According to another embodiment a data decompression device includes means for receiving an encoded binary number that includes a second predefined number m1 of bits, wherein the encoded binary number includes a binary value and binary position information of variable length. The data decompression device further includes means for identifying, in the encoded binary number, the binary position information and the binary value. A second electronic circuit is adapted for obtaining, from the binary position information, a target position. The data decompression device further includes means for compiling a decoded binary number comprising a first predefined number n1 of bits, wherein the decoded binary number comprises a highest-weighted bit unequal to zero at the target position and the binary value at bit positions following the target position.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 shows an example of encoding rounded raw binary numbers encoded by using the code table of FIG. 5B.

DETAILED DESCRIPTION

Figure 1:
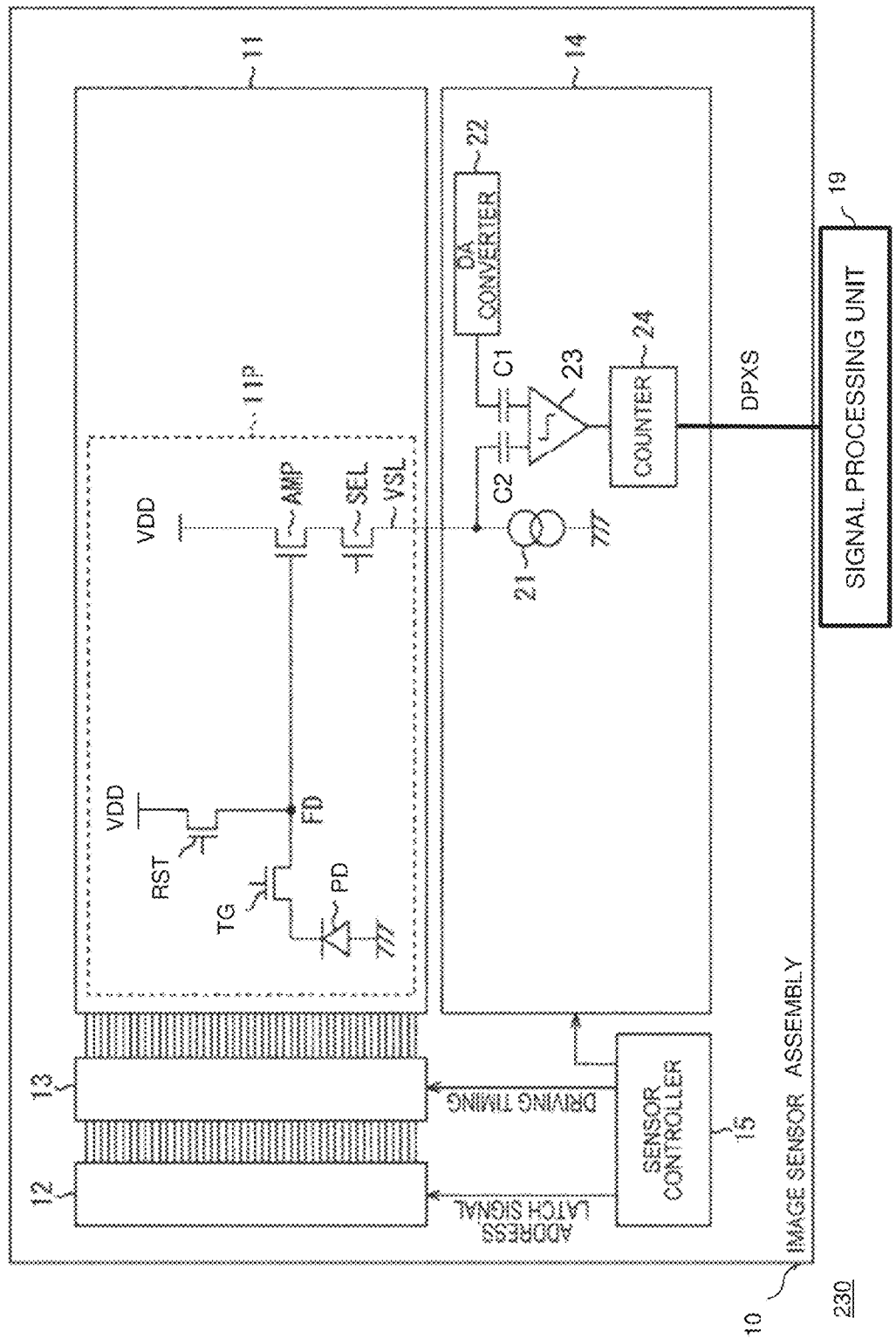
FIG. 1 is a block diagram illustrating an embodiment of a solid-state imaging device including a data compression device according to an embodiment of the present technology.

Referring now to the drawings, wherein like reference numerals designate identical or corresponding parts throughout the several views. In the following, a technology for at least one of reducing power consumption, reducing the number of electronic circuits and reducing data compression errors is described in the context of solid-state imaging devices.

The technology may also be used for compressing any type of binary data, in particular when for high binary values the information about the less significant bits is of low relevance. For example, the technology may be applied for any type of sensor susceptible to noise and covering a comparatively wide measuring range. In particular, the technology may be applied in the field of all types of audio signals and video signals.

FIG. 1 illustrates a configuration example of a solid-state imaging device 230 including an image sensor assembly 10 and a signal processing unit 19 according to an embodiment of the present technology.

The image sensor assembly 10 includes a pixel array unit 11, an address decoder 12, a pixel timing driving unit 13, an ADC (analog-to-digital converter) 14, and a sensor controller 15.

The pixel array unit 11 includes a plurality of pixel circuits 11P arranged matrix-like in rows and columns. Each pixel circuit 11P includes a photosensitive element and FETs (field effect transistors) for controlling the signal output by the photosensitive element.

The address decoder 12 and the pixel timing driving unit 13 control driving of each pixel circuit 11P disposed in the pixel array unit 11. That is, the address decoder 12 supplies a control signal for designating the pixel circuit 11P to be driven or the like to the pixel timing driving unit 13 according to an address, a latch signal, and the like supplied from the sensor controller 15. The pixel timing driving unit 13 drives the FETs of the pixel circuit 11P according to driving timing signals supplied from the sensor controller 15 and the control signal supplied from the address decoder 12. The electric signals of the pixel circuits 11P (pixel output signals) are supplied through vertical signal lines VSL to ADCs 14, wherein each ADC 14 is connected to one of the vertical signal lines VSL, and wherein each vertical signal line VSL is connected to all pixel circuits 11P of one column of the pixel array unit 11. Each ADC 14 performs an analog-to-digital conversion on the pixel output signals successively output from the column of the pixel array unit 11 and outputs the digital pixel data DPXS to the signal processing unit 19. To this purpose, each ADC 14 includes a comparator 23, a digital-to-analog converter (DAC) 22 and a counter 24.

The sensor controller 15 controls the entire image sensor assembly 10. That is, for example, the sensor controller 15 supplies the address and the latch signal to the address decoder 12, and supplies the driving timing signal to the pixel timing driving unit 13. In addition, the sensor controller 15 may supply a control signal for controlling the ADC 14.

The pixel circuit 11P includes a photoelectric conversion element PD as the photosensitive element. The photoelectric conversion element PD may include or may be composed of, for example, a photodiode. With respect to one photoelectric conversion element PD, the pixel circuit 11P may have four FETs serving as active elements, i.e., a transfer transistor TG, a reset transistor RST, an amplification transistor AMP, and a selection transistor SEL.

The photoelectric conversion element PD photoelectrically converts incident light into electric charges (here, electrons). The amount of electric charge generated in the photoelectric conversion element PD corresponds to the amount of the incident light.

The transfer transistor TG is connected between the photoelectric conversion element PD and a floating diffusion region FD. The transfer transistor TG serves as a transfer element for transferring charge from the photoelectric conversion element PD to the floating diffusion region FD. The floating diffusion region FD serves as temporary local charge storage. A transfer signal serving as a control signal is supplied to the gate (transfer gate) of the transfer transistor TG through a transfer control line.

Thus, the transfer transistor TG may transfer electrons photoelectrically converted by the photoelectric conversion element PD to the floating diffusion FD.

The reset transistor RST is connected between the floating diffusion FD and a power supply line to which a positive supply voltage VDD is supplied. A reset signal serving as a control signal is supplied to the gate of the reset transistor RST through a reset control line.

Thus, the reset transistor RST serving as a reset element resets a potential of the floating diffusion FD to that of the power supply line.

The floating diffusion FD is connected to the gate of the amplification transistor AMP serving as an amplification element. That is, the floating diffusion FD functions as the input node of the amplification transistor AMP serving as an amplification element.

The amplification transistor AMP and the selection transistor SEL are connected in series between the power supply line LVDD and a vertical signal line VSL.

Thus, the amplification transistor AMP is connected to the signal line VSL through the selection transistor SEL and constitutes a source-follower circuit with a constant current source 21 illustrated as part of the ADC 14.

Then, a selection signal serving as a control signal corresponding to an address signal is supplied to the gate of the selection transistor SEL through a selection control line, and the selection transistor SEL is turned on.

When the selection transistor SEL is turned on, the amplification transistor AMP amplifies the potential of the floating diffusion FD and outputs a voltage corresponding to the potential of the floating diffusion FD to the signal line VSL. The signal line VSL transfers the pixel output signal from the pixel circuit 11P to the ADC 14.

Since the respective gates of the transfer transistor TG, the reset transistor RST, and the selection transistor SEL are, for example, connected in units of rows, these operations are simultaneously performed for each of the pixel circuits 11P of one row.

The ADC 14 may include a DAC 22, the constant current source 21 connected to the vertical signal line VSL, a comparator 23, and a counter 24.

The vertical signal line VSL, the constant current source 21 and the amplifier transistor AMP of the pixel circuit 11P combine to a source follower circuit.

The DAC 22 generates and outputs a reference signal. By performing digital-to-analog conversion of a digital signal increased in regular intervals, e.g. by one, the DAC 22 may generate a reference signal including a reference voltage ramp. Within the voltage ramp, the reference signal steadily increases per time unit. The increase may be linear or not linear.

The comparator 23 has two input terminals. The reference signal output from the DAC 22 is supplied to a first input terminal of the comparator 23 through a first capacitor C1. The pixel output signal transmitted through the vertical signal line VSL is supplied to the second input terminal of the comparator 23 through a second capacitor C2.

The comparator 23 compares the pixel output signal and the reference signal that are supplied to the two input terminals with each other, and outputs a comparator output signal representing the comparison result. That is, the comparator 23 outputs the comparator output signal representing the magnitude relationship between the pixel output signal and the reference signal. For example, the comparator output signal may have high level when the pixel output signal is higher than the reference signal and may have low level otherwise, or vice versa. The comparator output signal VCO is supplied to the counter 24.

The counter 24 counts a count value in synchronization with a predetermined clock. That is, the counter 24 starts the count of the count value from the start of a P phase or a D phase when the DAC 22 starts to decrease the reference signal, and counts the count value until the magnitude relationship between the pixel output signal and the reference signal changes and the comparator output signal is inverted. When the comparator output signal is inverted, the counter 24 stops the count of the count value and outputs the count value at that time as the AD conversion result (digital pixel data DPXS) of the pixel output signal.

Figure 2:
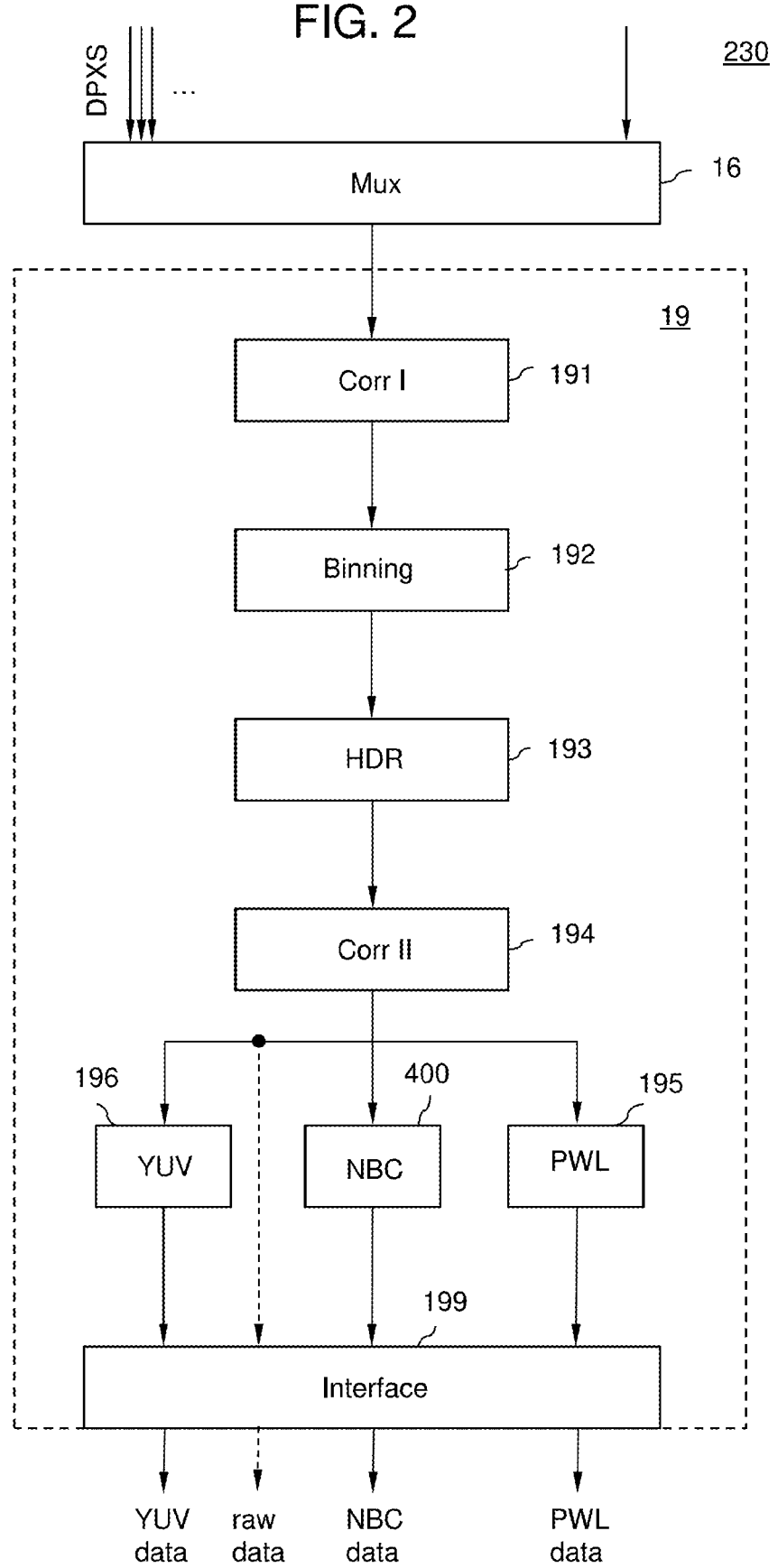
FIG. 2 is a block diagram of a signal processing unit including a data compression device according to an embodiment of the present technology.
Figure 3:
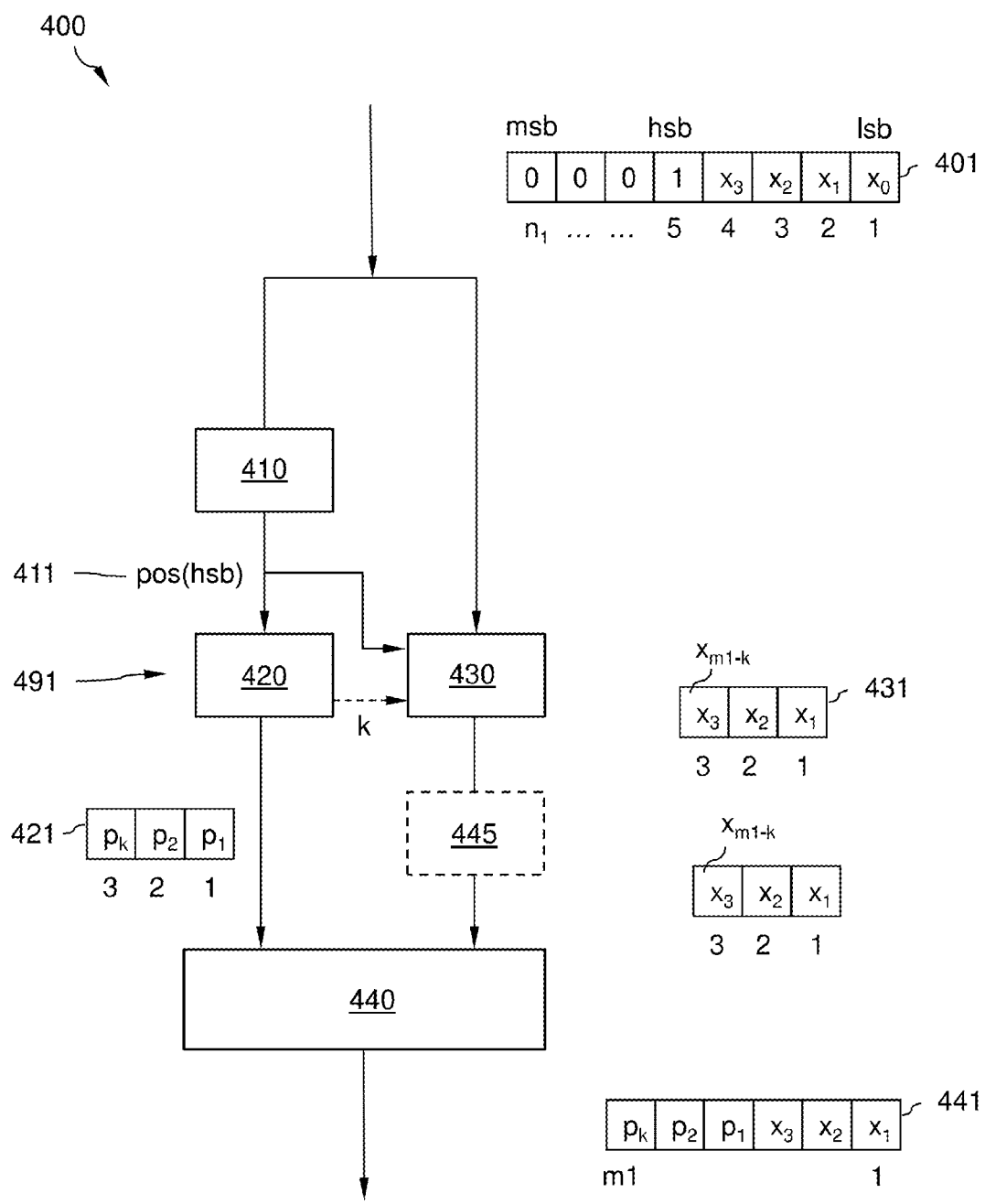
FIG. 3 is a block diagram illustrating functional blocks of a data compression device according to an embodiment of the present technology.

FIG. 2 shows details of the signal processing unit 19 as illustrated in FIG. 1. A multiplexer 16 may successively forward the digital pixel data DPXS obtained from the ADCs 14 of each column of pixels as illustrated in FIG. 1 to a pixel correction unit 191 that receives and processes the digital pixel data DPXS output by the ADCs 14 of FIG. 1. In particular, the pixel correction unit 191 may correct pixel-specific defects, may reduce pixel-specific noise, e.g. by using CDS (correlated double sampling) or DDS (double data sampling), and/or may perform spectrum correction.

A binning unit 192 may combine the corrected digital pixel data DPXS of neighboring pixel circuits to increase the signal-to-noise ratio.

Each digital value of the digital pixel data DPXS includes an image portion and a read noise portion, wherein the read noise portion includes the total amount of noise generated by the pixel circuit 11P and the ADC 14 when converting the charge collected in one photoelectric conversion element PD into the digital pixel data DPXS. The binning unit 192 may add up the digital pixel data of neighboring pixel circuits 11P arranged in 2×2, 3×3 or 4×4 arrays. The image portions of the digital pixel data values may add up. The noise, by contrast, accumulates only statistically. In this way, the binning unit 192 may increase the signal-to-noise ratio at the cost of reduced resolution. The binning unit 192 may be active only in certain operation modes of the solid-state imaging device 230. If inactive, the binning unit 192 may forward the corrected digital pixel data received from the pixel correction unit 191 without change.

A HDR (high dynamic range) combination unit 193 may combine successive frames exposed at different exposure times. The HDR combination unit 193 may be active only in certain operation modes of the solid-state imaging device 230. If inactive, the HDR combination unit 193 may forward the corrected digital pixel data received from the binning unit 192 without change.

An accessory correction unit 194 may apply further correction methods, e.g. advanced noise reduction and/or lens shading correction. The accessory correction unit 194 may be active only in certain operation modes of the solid-state imaging device 230. If inactive, the accessory correction unit 194 may forward the digital pixel data received from the HDR combination unit 193 without change. The signal at the output of the accessory correction unit 194 includes the raw image data.

The raw image data includes a sequence of frames, wherein each frame includes a number of raw binary numbers. Each raw binary number represents a processed digital pixel data value.

The number of raw binary numbers per frame depends on the number of pixels in the array of pixels. For example, the number of raw binary numbers per frame may be equal to the number of pixels in the array of pixels.

A customary compression unit 195 may compress the raw image data and may output the compressed raw image data. The customary compression unit 195 may use a PWL (piece-wise linear) compression algorithm.

The signal processing unit 19 may further include a YUV converter unit 196 that converts the raw image data into YUV image data, wherein the YUV image data describes each frame in the YUV color space.

The signal processing unit 19 further includes a data compression device 400 according to the embodiments. The data compression device 400 compresses the raw image data by using a neuro-binary data compression (NBC) method as described below and outputs image data compressed by the neuro-binary data compression method, wherein the data compression device 400 outputs one encoded binary number per each single raw binary number included in the raw image data.

An interface unit 199 outputs at least the image data compressed by using the neuro-binary data compression method. Alternatively or in addition, the interface unit 199 may output at least one of the raw image data, the raw image data compressed in the customary compression unit 195, and the YUV image data.

The interface unit 199 may include one physical port for each type of output data provided by the signal processing unit 19. Alternatively, the interface unit 199 may include a configurable physical port capable of alternatively outputting the raw image data compressed by using the neuro-binary data compression method and at least one of the raw image data, the raw image data compressed in the customary compression unit 195, and the YUV image data. Alternatively, the interface unit 199 may include one multiplexed physical port capable of alternatingly outputting the raw image data compressed by the neuro-binary data compression method and at least one of the raw image data, the raw image data compressed in the customary compression unit 195, and the YUV image data.

Though FIG. 2 combines the data compression device 400 with digital pixel data obtained from 4-transistor CMOS pixel circuits, the use of the data compression device 400 is not limited to the combination with 4-transistor CMOS pixel circuits. Instead, the data compression device 400 may receive digital pixel data obtained through other types of image sensors and other types of digital sensor signals, e.g. digital acoustic signals or other digital signals encoding any physical value.

FIG. 7 shows details of the data compression device 400 shown in FIG. 6. Here and in the following, the description refers to parts of the data compression device 400 in terms of functional blocks, wherein each functional block is assigned to and executes a part of the data compression method implemented by the data compression device 400. Any of the functional blocks may be realized only by hardware, e.g. by a non-programmable logic circuit, by a programmable logic circuit, by a complete application specific circuit, or by a portion of an application specific circuit. Alternatively, any of the functional blocks may be realized by a program code locally stored in a memory unit of the data compression device 400 and executed by a local controller integrated in the data compression device 400. Alternatively, any of the functional blocks may be realized as a combination of executed program code and hardware elements.

Generally, the separation of the different functions represented by the functional blocks serves for the purpose of explaining the function of the data compression device 400 and the data compression method performed by the data compression device 400 as a whole and does not necessarily imply a physical separation of the functional blocks in terms of electronic circuits and program code routines. Instead, the illustrated functional blocks may be interdigitated with each other in one or more respects, e.g. in a logic circuit or a program code. In particular, different functional blocks may share some common resources, e.g. logic circuits, electronic storage elements, and/or program routines. The functional blocks may be considered as means for performing the respective function.

The data compression device 400 includes a first functional block 410 that receives a raw binary number 401. The raw binary number 401 includes a first predefined number n1 of bits. The first predefined number n1 may be any integer number greater 7, wherein the first predefined number n1 may be a multiple of 4 or a multiple of 6. For example, the first predefined number n1 may be 8, 12, 14, 16, 18, 20, 24, 28 or 30.

The value of each bit in the raw binary number 401 may be "0" (zero) or "1" (one). The weight of each bit with the value "1" in the raw binary number 401 depends on its position n in the raw binary number 401. The lsb (least significant bit) of the raw binary number 401 is shown on the right hand side of the raw binary number 401 on bit position 1 (n=1). The msb (most significant bit) is shown on the left hand side on bit position n1 (n=n1). Each bit unequal zero represents a decimal value (weight) of $2^{(n-1)}$.

In the illustrated embodiment, the msb and the two bits following the msb are "0". A highest-weighted bit unequal zero is at position n=5. The decimal value (weight) is equal 16. Each of the bits following the highest-weighted bit unequal zero in direction to the lsb has an arbitrary value and may be "0" or "1".

The first functional block 410 identifies, in the raw binary number 401, the position pos(hsb) 411 of the highest-weighted bit hsb unequal zero. The identified position pos (hsb) 411 is an integer number in a range from 1 to n1. In the illustrated embodiment, the identified position pos(hsb) 411 of the highest-weighted bit hsb unequal zero is equal 5.

A second functional block 420 receives the identified position 411 and provides binary position information 421 that identifies the position of the highest-weighted bit unequal zero in the raw binary number 401, e.g. by encoding the identified position 411 according to a predefined scheme.

The second functional block 420 may include a first electronic circuit 491 or may be part of a first electronic circuit 491. The first electronic circuit 491 may include further functional blocks. The first electronic circuit 491 may exclusively include logic gates, may include a storage unit, e.g. a programmable storage unit or a read-only storage unit, or may include a combination of logic circuits and storage unit(s). The first electronic circuit 491 may be a complex electronic circuit capable of executing further tasks.

The binary position information 421 may unambiguously encode the identified position of the highest-weighted bit unequal zero.

According to an embodiment, the binary position information 421 may include a variable number k of bits defining the variable length of the binary position information 421. The variable number k of the binary position information 421 may be selected depending on the identified position pos(hsb) 411 of the highest—weighted bit hsb unequal zero in the raw binary number 401.

The binary position information 421 may include a higher number of bits when the identified position has a low value and the hsb is closer to the lsb than to the msb. The binary position information 421 may include a lower number of bits when the identified position has a medium or a higher value and is closer to the msb. The length k of the binary position information 421 may have a minimum for one or more positions of the hsb in the middle third of the raw binary number 401.

According to an embodiment, the binary position information 421 may include a first number k1 of bits if in the raw binary number 401 the highest-weighted bit hsb unequal zero is the most significant bit msb of the raw binary number 401. The binary position information 421 may include a second number k2 of bits if in the raw binary number 401 all but the least significant bit lsb are equal zero. The binary position information may include a number of bits lower than the first number k1 and lower than the second number k2 if in the raw binary number 401 a position of the highest-weighted bit hsb is in a predefined range between and excluding the least significant bit lsb and the most significant bit msb.

For example, in the illustrated embodiment, the second functional block 420 encodes the identified position pos (hsb) 411 of the highest-weighted bit hsb unequal zero in the raw binary number 401 with a binary position information 421 consisting of 3 bits, i.e. k=3.

A third functional block 430 receives information about the length k of the binary position information 421. For example, the third functional block 430 receives the identified position 411 (continuous line) and holds information assigning a corresponding length information to each possible identified position pos(hsb) 411. According to another example (broken line), the third functional block 430 may receive information, which identifies the length k of the binary position information 421, directly from the second functional block.

The third functional block 430 further receives at least the part of the raw binary number 401 following the highest-weighted bit hsb unequal zero. From the part of the raw binary number 401 directly following the highest-weighted bit hsb unequal zero, the third functional block 430 obtains a partial binary number 431. The partial binary number 431 consists of a variable number j of bits directly following the highest-weighted hsb bit unequal zero.

The sum of the variable number j and the variable length k of the binary position information 421 is the same for all possible values of the raw binary number 401. The variable number j is high when the length k of the binary position number 421 is small and the variable number j is low when the length k of the binary position number 421 is high. In the illustrated example, the variable number j of bits of the partial binary number 431 is equal 3.

Based on the binary position information 421 and on the partial binary number 431 being a portion of the raw binary number 401 directly following the highest-weighted bit hsb unequal zero, a fourth functional block 440 compiles an encoded binary number 441.

The encoded binary number 441 may include a direct copy of the partial binary number 431 in the form as it is included in the raw binary number 401. Alternatively, the partial binary number 431 may be post-processed, e.g. rounded, wherein the encoded binary number 441 may include a post-processed version of the partial binary number 431.

The encoded binary number 441 includes, e.g. consists of a second predefined number m1 of bits, wherein the second predefined number m1 of bits is smaller than the first predefined number n1 of bits (m1<n1). The second predefined number m1 may be equal to the sum of the variable number j of the bits of the partial binary number 431 and the length k of bits of the binary position information 421 (m1=k+j).

The second predefined number m1 may be any integer number greater 3, wherein the second predefined number m1 may be a multiple of 4 or a multiple of 6. For example, the second predefined number m1 may be 4, 6, 8, 10, 12, 14, 16, 18, or 20. The second predefined number m1 may be in a range from INT(n1/4) to INT((n1*3)/4), for example in a range from n1/2−2 to n1/2+2 (n1/2−2≤n1/2+2). According to an example, the second predefined number m1 may be equal to n1/2 (m=n1/2).

According to another example for the first predefined number equal to 24 (n1=24), m1 may be one of 12, 14, 16 or 20.

The data compression device 400 facilitates encoding of all possible raw binary numbers 401 with a first predefined number n1 of bits into encoded binary numbers 441 with a smaller, second predefined number m1 of bits, wherein each encoded binary number 441 contains a first part including unambiguous information about the position of the highest-weighted bit hsb unequal zero in the raw binary number 401 and a second part including information about the value of the bits directly following the highest-weighted bit hsb unequal zero in the raw binary number 401.

By appropriately assigning suitable numbers of bits to the first part and to the second part in dependence of the value of the raw binary number 401, the compression characteristics of the data compression can be adapted to special requirements. In particular, the compression characteristics may include that for a first (lower) range of values of the raw binary number the compression is less lossy, e.g. completely lossless compared to a second (higher) range of values of the raw binary number, wherein within the second range the compression error may be adjusted to different requirements.

According to an embodiment, if in the raw binary number 401 the identified position of the highest-weighted bit hsb unequal zero is lower than a predefined position m0, with m0<m1, for each position m with 1≤m≤m0, the m-th bit in the encoded binary number may be set equal to a corresponding m-th bit of the raw binary number 401.

The predefined position m0 may be any integer number greater 3, wherein the predefined position m0 may be a multiple of 4 or a multiple of 6. For example, the predefined position m0 may be 4, 6, 8, 10, 12, 14, 16, 18, or 20. The predefined position m0 may be in a range from INT(n1/4) to INT((n1*3)/4), for example in a range from n1/2−2 to n1/2+2 (n1/2−2≤m0≤n1/2+2). According to an example, the predefined position m0 may be equal to n1/2 reduced by one (m0=(n1/2)−1).

For example, for the first range of values of the raw binary number 401 the partial binary number 431 may have the same number of bits as the portion of the raw binary number 401 between the lsb and the highest-weighted hsb bit unequal zero. In this case, the encoded binary number 441 may consist of the binary position information 421 and a copy of the portion of the raw binary number 401 from the lsb to the highest-weighted bit hsb unequal zero.

In addition, the binary position information 421 may include or consist of a copy of a portion of the raw binary number 401 from including the highest-weighted bit hsb upward to a bit position corresponding to the length of the encoded binary number 441.

In other words, for a first range of values of the raw binary number 401, the encoded binary number 441 may include a copy of the section of the raw binary number 401 from including the lsb upwards to n=m1−1. In such cases the first range of values represents an axon part of a neuro-binary coding tree.

For the second range of values of the raw binary number 401 the partial binary number 431 may have fewer bits than the portion of the raw binary number 401 between the lsb and the highest-weighted bit hsb unequal zero. In such cases and if the first range of values represents an axon part of a neuro-binary coding tree, the second range of values represents a dendrite part of the neuro-binary coding tree.

The first range may include small values and the second range may include high values of the raw binary number. Then the data compression method carried out by the data compression device 400 may facilitate lossless compression for small values of the raw binary number and may be lossy for high values of the raw binary number. In particular, if the binary number represents an amplitude value of a physical signal, e.g. a signal received from a sensor, e.g. an audio signal or a signal output by an image sensor, the compression method is completely lossless for an amplitude range where loss of information is often more critical.

For example, the physical signal may be a signal perceptible by a human organ of perception, e.g. an audio signal or a light intensity signal. The perceptibility of absolute changes of the amplitude of an audio signal (sound pressure signal) by the human hearing depends on the amplitude of the audio signal. Likewise the perceptibility of absolute changes of the amplitude of a light intensity signal by the human visual sense depends on the amplitude of the light intensity signal. Since the compression method is lossless for small amplitudes and increasingly loses information only with increasing amplitude, the data loss may be tuned such that is has only low impact on the subjective quality of human perception.

Likewise, for automated analysis of audio signals and light intensity signals the evaluation of low-level signals, i.e. signals with the most significant bits having a value representing zero may be more critical and a data compression method which is lossless for such low-level signals may produce more satisfactory results than other methods such as PWL data compression.

Since compressing the raw binary may get along without division and/or multiplication, the data compression method implemented by the data compression device 400 may get along with less electronic circuits than alternative data compression circuits using PWL. In particular, the data compression device 400 can be realized with less data storage capacity. Power consumption of the data compression device 400 can be low compared to a compression device performing a PWL compression on the same raw binary data.

Figure 4:
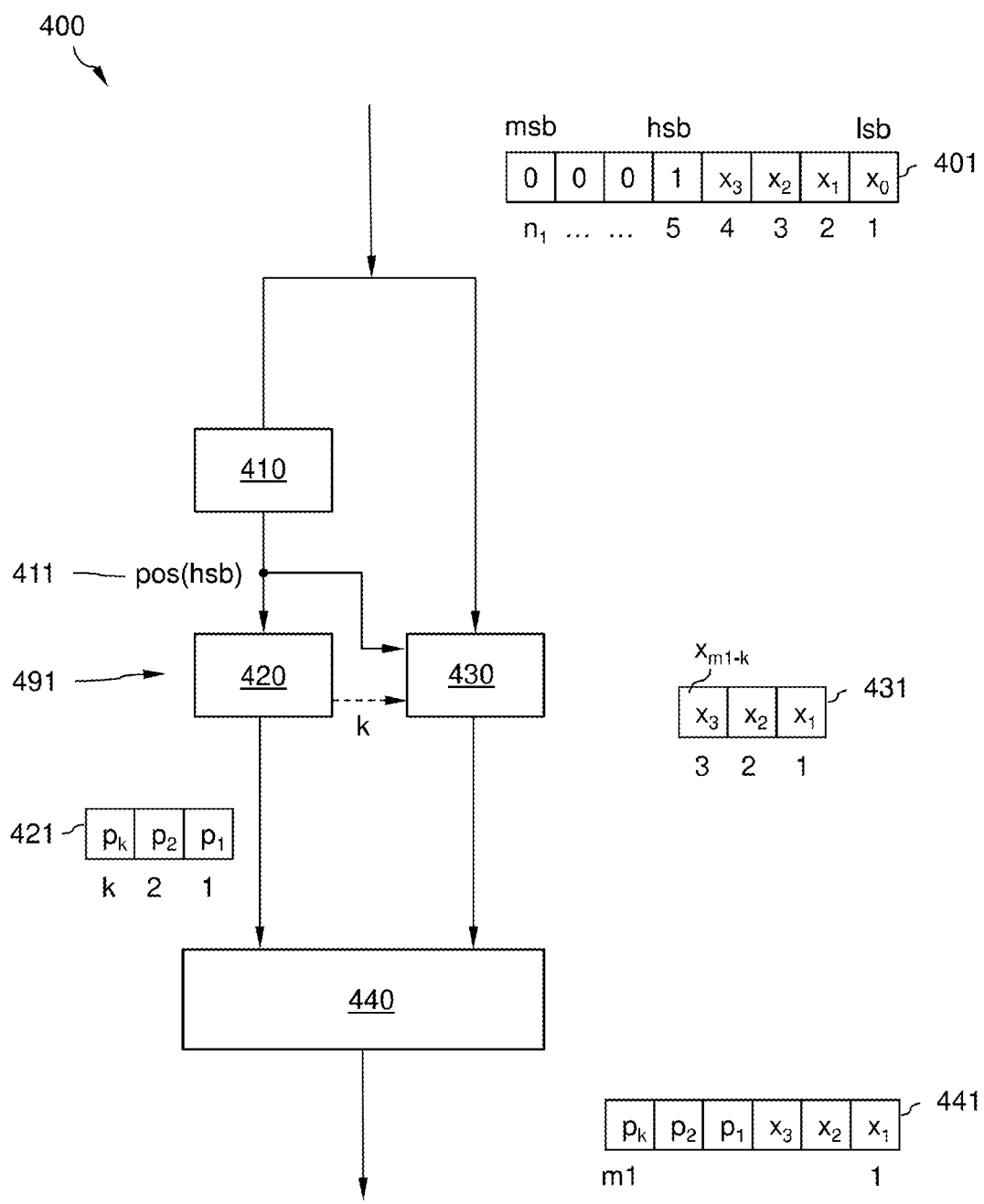
FIG. 4 is a block diagram illustrating functional blocks of a data compression device according to an embodiment with the encoded binary number including a copy of a portion of the raw binary number.

FIG. 4 shows a data compression device 400 according to an embodiment wherein for each possible value of the raw binary number 401 the encoded binary number 441 is compiled to include the binary position information 421 and a copy of the portion of the raw binary number 401 directly following the highest-weighted bit hsb unequal zero.

Figure 7A:
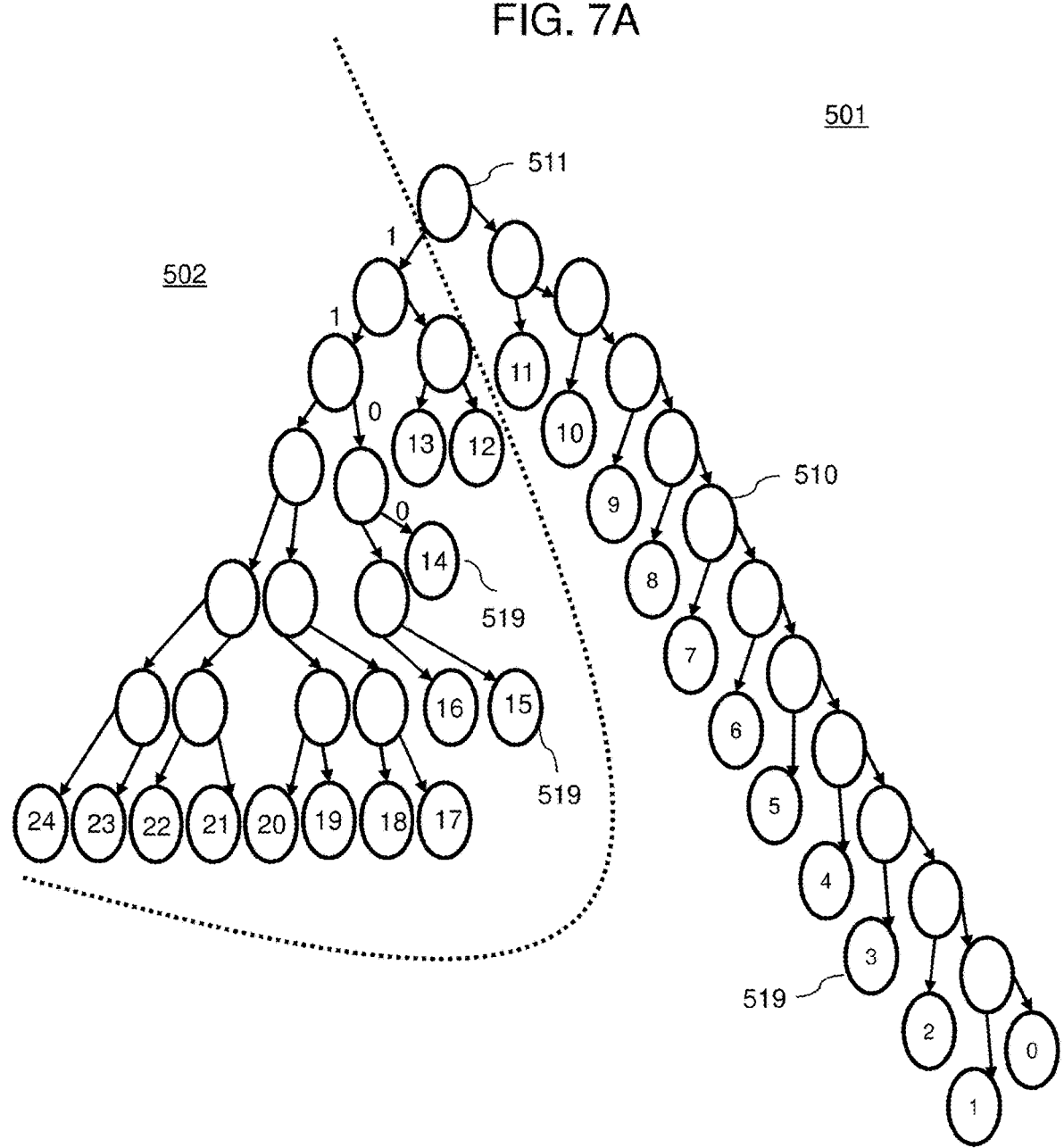
FIG. 7A shows a neuro-binary coding tree representation of the code table of FIG. 5B.
Figure 7B:
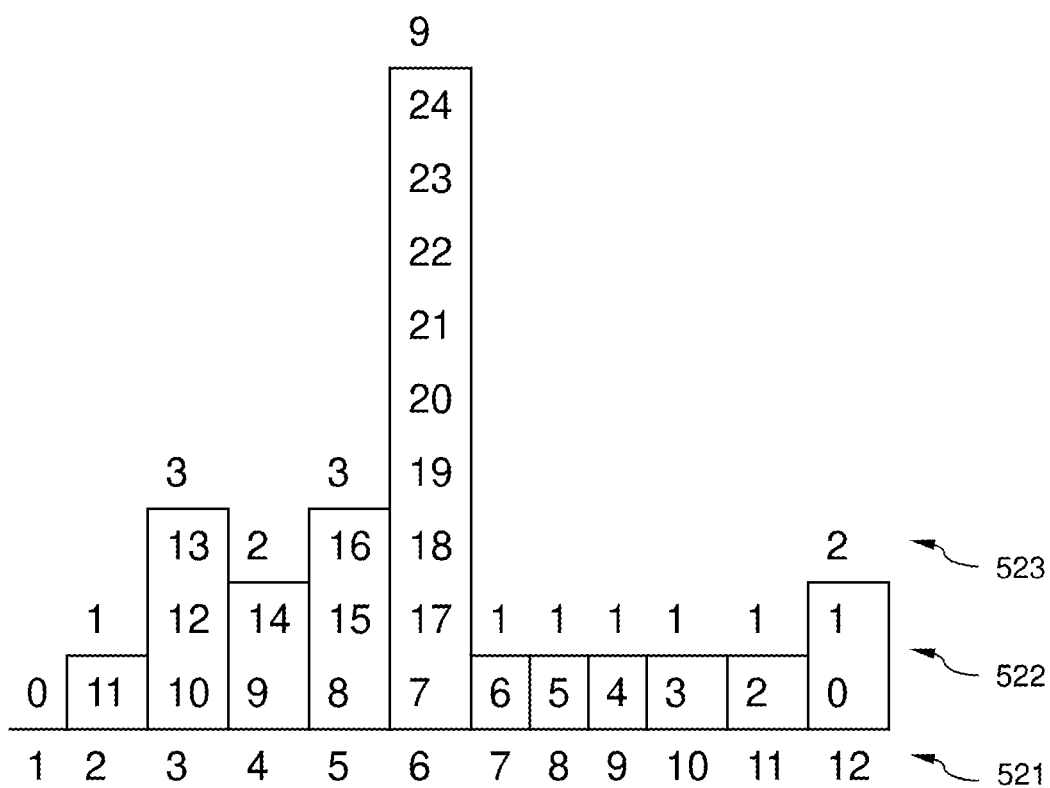
FIG. 7B shows a histogram of the code lengths instantiated by the code table in FIG. 5B.
Figure 8:
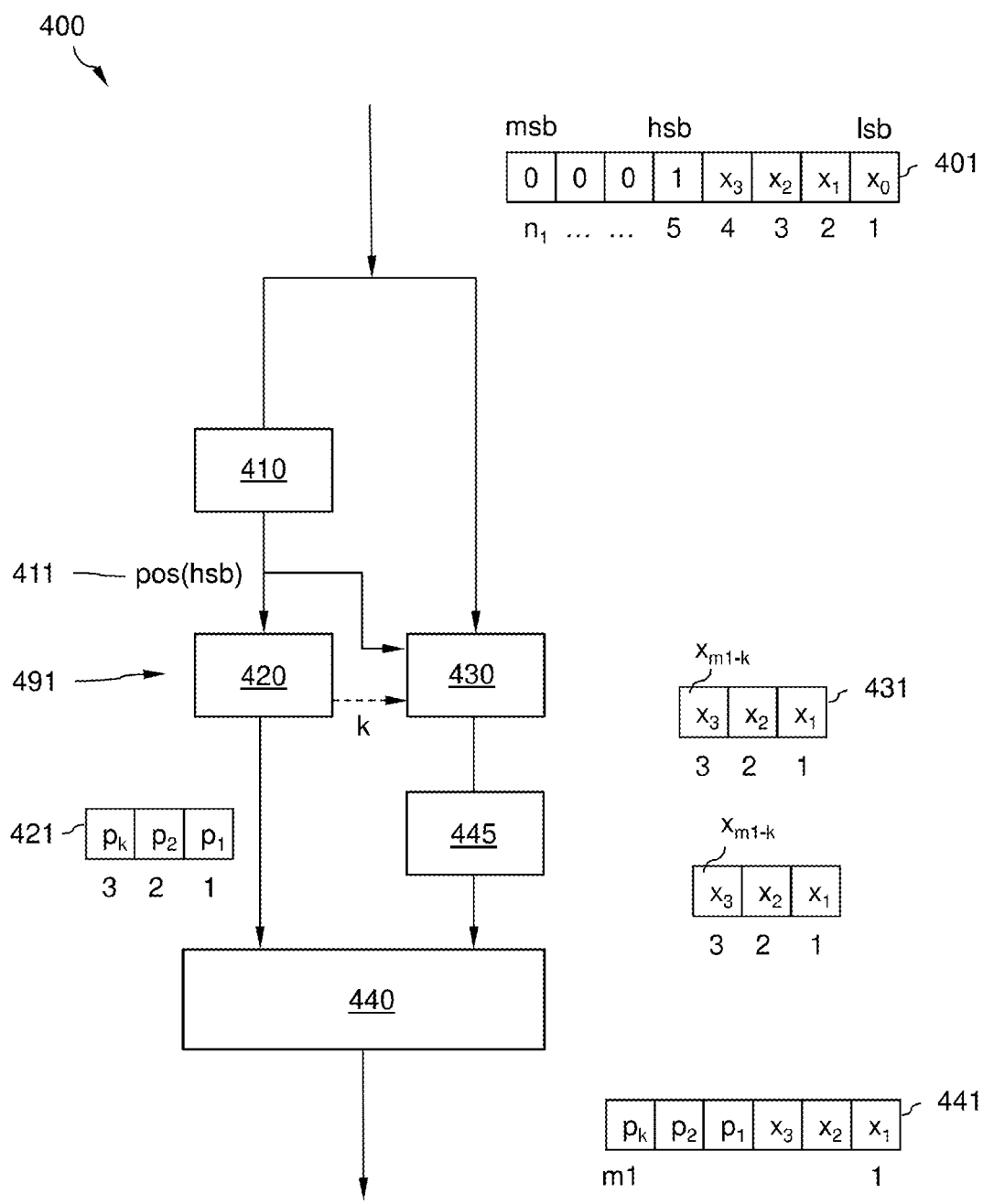
FIG. 8 is a block diagram illustrating functional blocks of a data compression device according to an embodiment providing rounding.

The function represented by the second functional block 420 as illustrated in FIGS. 7 and 8 is described in more detail with reference to FIGS. 5A to 5B.

Figure 5A:
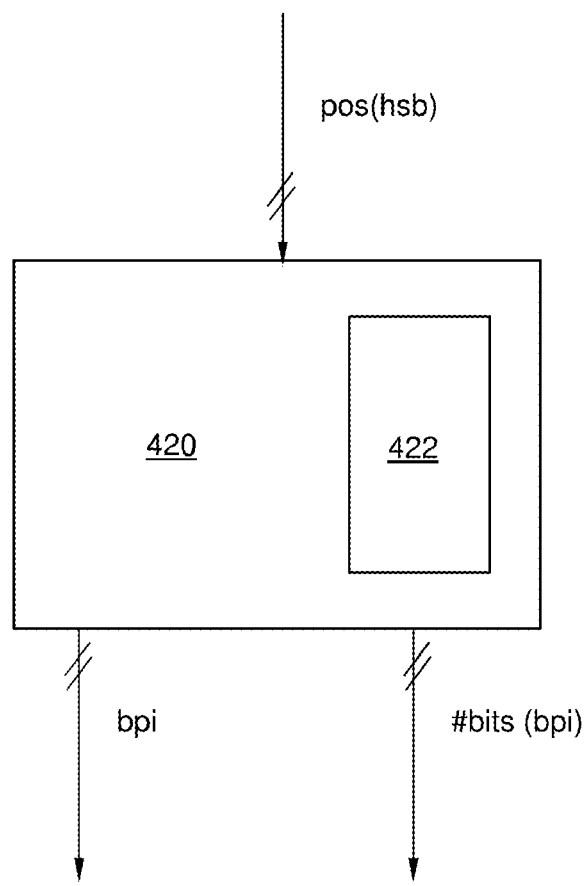
FIG. 5A is a block diagram of a functional block of a data compression device according to an embodiment.

The second functional block 420 shown in FIG. 5A receives information unambiguously identifying the position of the highest-weighted bit hsb unequal zero in a raw binary number, e.g. a binary value of the position.

The second functional block 420 holds an instance or representation of at least one code table 422. For example, the code table 422 may be realized as a logic circuit or as program code converting the input information in the desired output information. The code table 422 unambiguously assigns to each position of the highest-weighted bit hsb unequal zero in the raw binary number a binary position information bpi.

For each possible position of the highest-weighted bit hsb unequal zero in the raw binary number, the second functional block 420 outputs information identifying the binary position information bpi and information identifying the number of bits #bits(bpi) of the respective binary position number bpi.

Figure 5B:
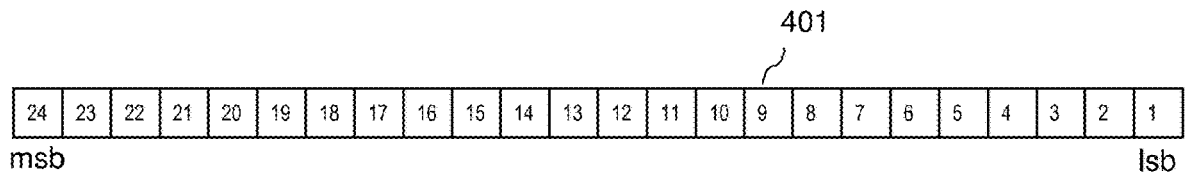
FIG. 5B shows an embodiment of a code table included in the functional block of FIG. 9A.

FIG. 5B shows an embodiment of the code table 422 in FIG. 5A for an example compressing 24 bit values to 12 bit values. In other words, the code table 422 is used to compress raw binary numbers 401 with a first predefined number of bits n1=24 down to encoded binary numbers with a second predefined number of bits m1=12.

The code table 422 assigns to each position pos(hsb) of the highest-weighted bit unequal zero in the raw binary number 401 binary position information (bpi) and the number of bits #bits(bpi) the respective binary position information bpi includes, e.g. consists of The decimal value dec(bpi) is a decimal representation of the binary position information bpi added for illustrative purpose only.

Figure 6A:
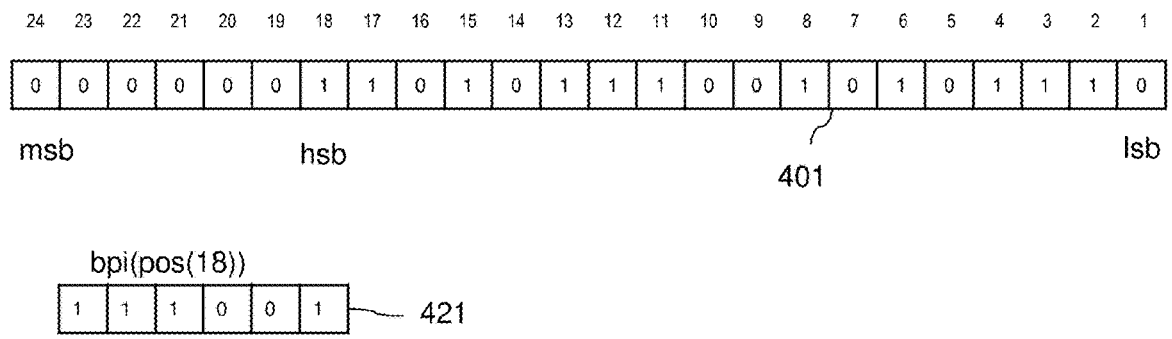
FIGS. 6A and 6B show examples of encoding raw binary numbers encoded by using the code table of FIG. 5B.

FIG. 6A shows a first example for compressing a 24 bit raw binary number 401 into a 12 bit encoded binary number 441 using the code table 422 in FIG. 5B.

The first line shows a 24 bit raw binary number with the msb on the left hand side, the lsb on the right hand side and the highest-weighted bit hsb unequal zero at bit position 18. In the code table 422 of FIG. 5B the entry for hsb=18 delivers the binary position information "111001" with #bits(bpi) equal to 6. The second line in FIG. 6A shows the 6 bit binary position information bpi(pos(18)) 421.

From the number of bits #bits(bpi) of the binary position information 421 and from the second predefined number m1 of bits of the encoded binary number 441 follows that the rest of the encoded binary number 441 includes 6 bits derived from the section of the raw binary number 401 directly following the highest-weighted bit hsb unequal to zero.

The third line in FIG. 6A shows a partial binary number 431 being a portion of the raw binary number 401 directly following the highest-weighted bit hsb unequal zero and including the six bits at bit positions 17, 16, 15, 14, 13, 12 directly following the hsb at bit position 18.

The fourth line in FIG. 6A shows the encoded binary number 441 compiled from the 6 bit binary position information 421 in the second line and the 6 bit partial binary number 431 in the third line, wherein the msb of the 6 bit binary information 421 is the msb of the encoded binary number 441 and wherein the lsb of the 6 bit partial binary information 421 is the lsb of the encoded binary number 441.

Figure 6B:
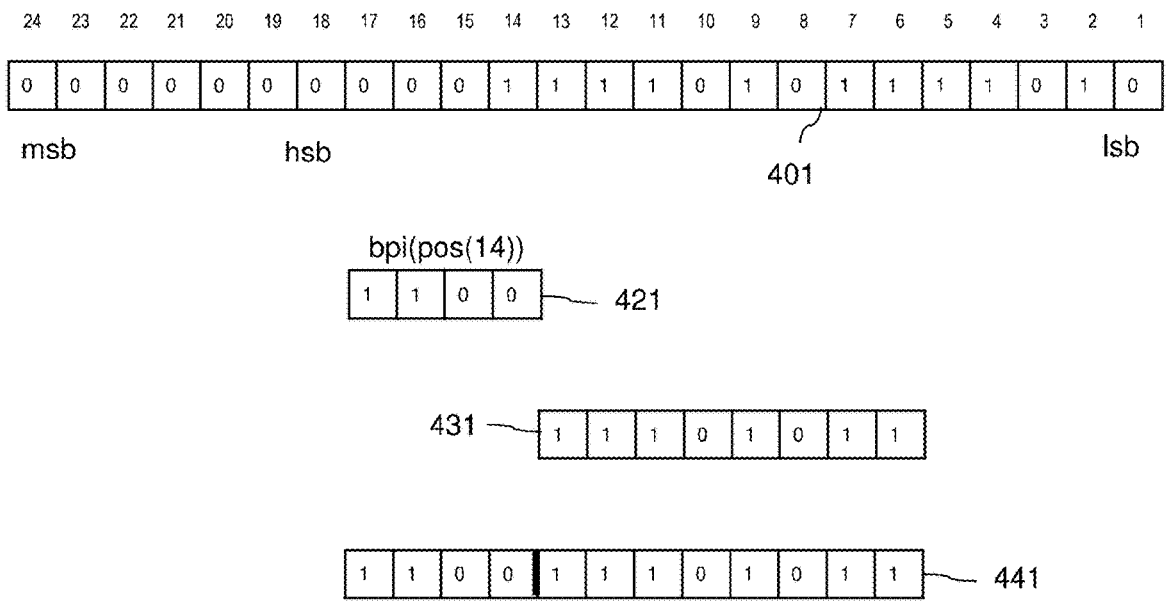

FIG. 6B shows a second example for compressing another 24 bit raw binary number 401 into a 12 bit encoded binary number 441 using the code table 422 in FIG. 5B.

The first line shows a 24 bit raw binary number with the highest-weighted bit hsb unequal zero at bit position 14.

In the code table 422 of FIG. 5B the entry for hsb=14 delivers the binary position information "1100" with #bits (bpi) equal to 4. The second line in FIG. 6B shows the 4 bit binary position information 421.

From the four bits of the binary position information #bits(bpi) and from m1=12 follows that the rest of the encoded binary number 441 includes 8 bits derived from the section of the raw binary number 401 directly following the highest-weighted bit hsb at bit position 14.

The third line in FIG. 6B shows a partial binary number being a portion of the raw binary number 401 directly following the highest-weighted bit hsb unequal zero and including the eight bits at bit positions 13, 12, 11, 10, 9, 8, 7, 6 in this order.

The fourth line in FIG. 6B shows the encoded binary number 441 compiled from the 4 bit binary position information 421 in the second line and the 8 bit partial binary number 431 in the third line, wherein the msb of the 4 bit binary information 421 is the msb of the encoded binary number 441 and wherein the lsb of the 8 bit partial binary information 421 is the lsb of the encoded binary number 441.

FIG. 7A shows a neuro-binary coding tree 500 as an alternative representation of the code table 422 of FIG. 5B.

Each empty node 510, 511 represents a binary decision. The possible results of each decision are "1" represented by an arrow downwards and oriented more to the left and "0" represented by an arrow downwards and oriented more to the right. Each code word is obtained by starting at the root node 511 and following a decision path along the direction of the arrows to any of the leaves 519 at the end of the respective decision path. The numbers in the leaves 519 indicate the hsb position encoded by the sequence of decisions made in the respective decision path.

For example, starting from the root node 511 the successive decisions 1-1-0-0 result in the code word "1100" encoding the hsb position 14. The neuro-binary coding tree 500 includes 25 different paths, 24 of them indicating hsb positions 1 to 24 and the $25^{th}$ indicating the absence of any hsb, in other words, the raw binary number with the value "0".

In an axon part 501 of the neuro-binary coding tree 500 encoding is lossless, since the upper half of the raw binary number is "000000000000" and the bits for encoding the hsb position are identical with the corresponding bits in the raw binary number. In other words, the encoded representation of all raw binary numbers with the hsb in a position from the lsb to bit position 11 and the representation of the raw binary number "0" is equal to the raw binary number from the lsb to bit position 11.

In the dendrite part 502 of the neuro-binary coding tree 500 encoding is lossy, wherein the data loss increases gradually with the hsb position approximating the msb position.

FIG. 7B shows the length histogram of the neuro-binary coding tree 500 in FIG. 7A. The numbers in line 521 at the bottom of the length histogram indicate the code length 521 used for the respective binary position information. The code length ranges from 1 to 12. The numbers in the columns 522 indicate the hsb positions encoded with the respective number of bits given in line 521. The numbers 523 above the columns 522 indicate how many hsb positions are encoded with the number of bits given in line 521. For example, nine different hsb positions are encoded with the code length equal 6. Twelve bits are used for encoding the value "000000000000000000000000" and the value "000000000000000000000001".

According to an embodiment, a median of the length histogram of the neuro-binary coding tree representing the coding is smaller than the binary logarithm of the integer value of half of the second number of bits m1 (median(code lengths)<log 2((m1)/2)).

With m1=12, log 2(12/2) approximates 2.58.

For the code table of FIG. 5B and FIG. 7A the median of the code lengths 0,1,3,2,3,9,1,1,1,1,1,2 is the mean of the two middle values of a list 0,1,1,1,1,1,1,2,2,3,3,9 of the code lengths listed in order from the smallest to the greatest code length. The list has 12 elements. The $6^{th}$ element and the $7^{th}$ element are equal 1. The mean of the two middle values is 1. The median of the code lengths is smaller than the log 2((m1)/2), which approximates to 2.58.

FIG. 8 refers to an embodiment with the fourth functional block including a preprocessing functional block 445 modifying the portion of the raw binary number 401 following the hsb before getting combined with the binary position information 421.

The preprocessing functional block 445 is active for such values of the raw binary number 401 for which compression is lossy. Then the copied portion of the raw binary number includes only a true subset of the bits of the raw binary number between a highest-weighted truncated bit and the highest-weighted bit unequal zero.

According to an embodiment, if a difference between the second number m1 of bits and a number k of bits representing the binary position information is smaller than a number of bits in the raw binary number 401 from and including the least significant bit lsb to and excluding the highest-weighted bit hsb unequal zero, the preprocessing functional block 445 obtains a rounded binary number by increasing by one an auxiliary binary number obtained by expanding the partial binary number by the next less significant bit and then truncating, by one bit, the increased auxiliary binary number.

The fourth functional block then compiles the encoded binary number that contains, e.g. consists of the binary position information and the truncated auxiliary binary number.

FIG. 9 shows an example for compressing a 24 bit raw binary number 401 into a 12 bit encoded binary number 441 by using the preprocessing functional block 445 of FIG. 8 and the code table 422 of FIG. 5B.

The first line shows a 24 bit raw binary number 401 with the position of the highest-weighted bit hsb unequal zero at bit position 14. For pos(hsb(14)) the number of bits for the binary position information is equal 4. The number of bits for the partial binary number is equal 8. An auxiliary binary number 404 is obtained by expanding the eight bits following the hsb by the next less significant bit, which is the bit at bit position 5 in the illustrated example. The auxiliary binary number 404 is increased by one, e.g. by binary addition with a 24 bit auxiliary binary number 402. The auxiliary binary number 402 has one single bit unequal zero at that bit position by which the auxiliary binary number 404 has been expanded, which is bit position 5 in the illustrated example.

The resulting binary number 403 contains an 8 bit rounded binary number 405 at the eight bit positions following the hsb. The 8 bit rounded binary number 405 is used as the partial binary number in the following.

The fifth line shows the partial binary number 431 obtained by rounding from the portion of the raw binary number 401 directly following the highest-weighted bit hsb unequal zero.

The sixth line in shows the encoded binary number 441 compiled from the 4 bit binary position information 421 in the fourth line and the 8 bit partial binary number 431 in the fifth line.

Referring again to FIG. 8, the preprocessing functional block 445 may increase by one the value of the partial binary number 431 if in the raw binary number the bit at the bit position following the partial binary number is "1" and may leave the partial binary number 431 unaffected if in the raw binary number the bit at the bit position following the partial binary number is "0".

Neuro-binary compression considering the bit following the partial binary number ("sub-lsb") in the raw binary number halves the worst case error.

Figure 10A:
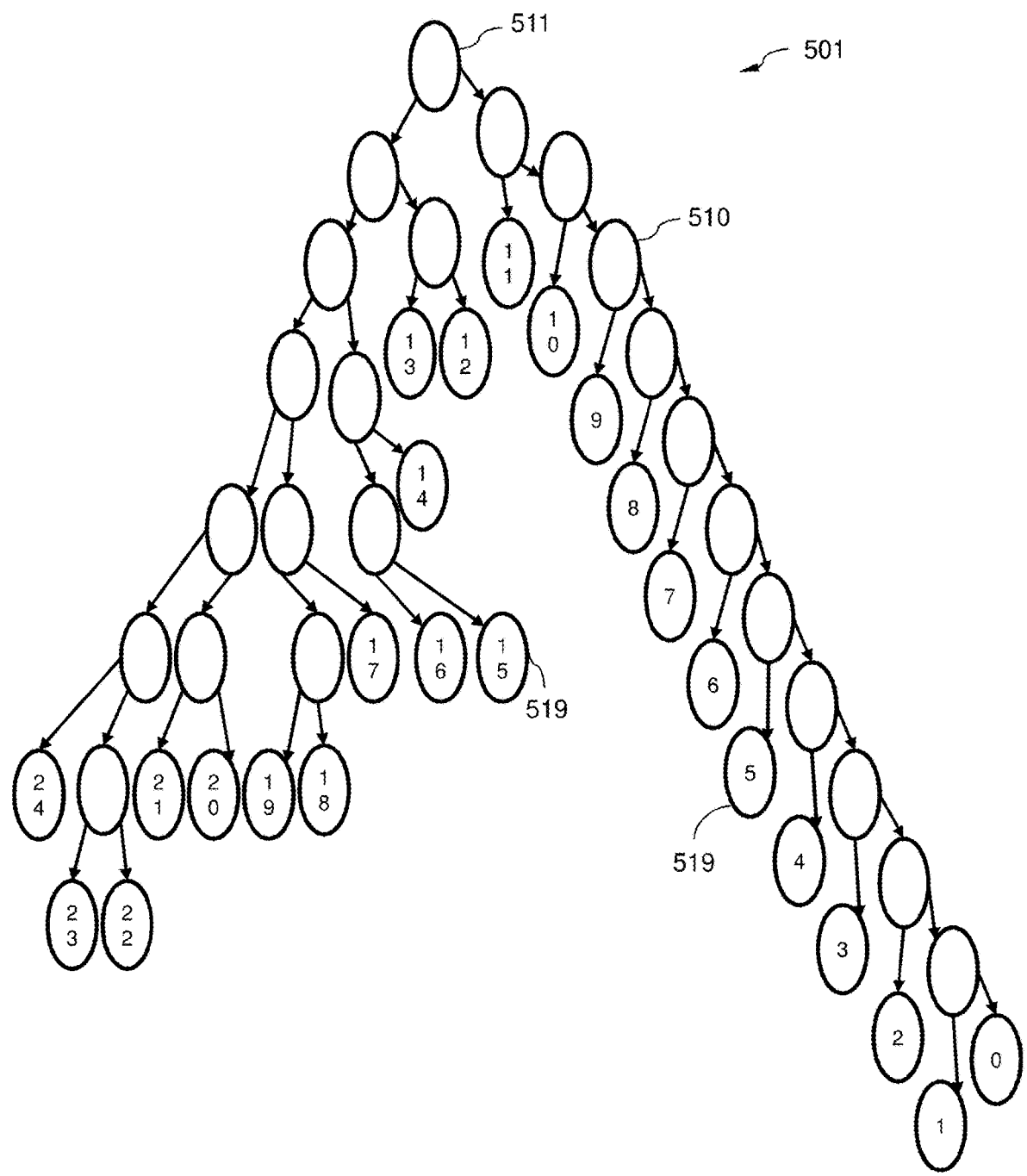
FIGS. 10A-10D show neuro-binary coding trees according to other embodiments.

FIG. 10A shows a neuro-binary coding tree 501 for encoding 24 bit raw binary numbers into 12 bit encoded binary numbers at a low qn/sn ratio. The qn/sn ratio is the ratio between the injected quantization noise and the already present photon shot noise and indicates the relevance of the quantization error.

The coding as indicated by the neuro-binary coding tree in FIG. 10A.

Figure 10B:
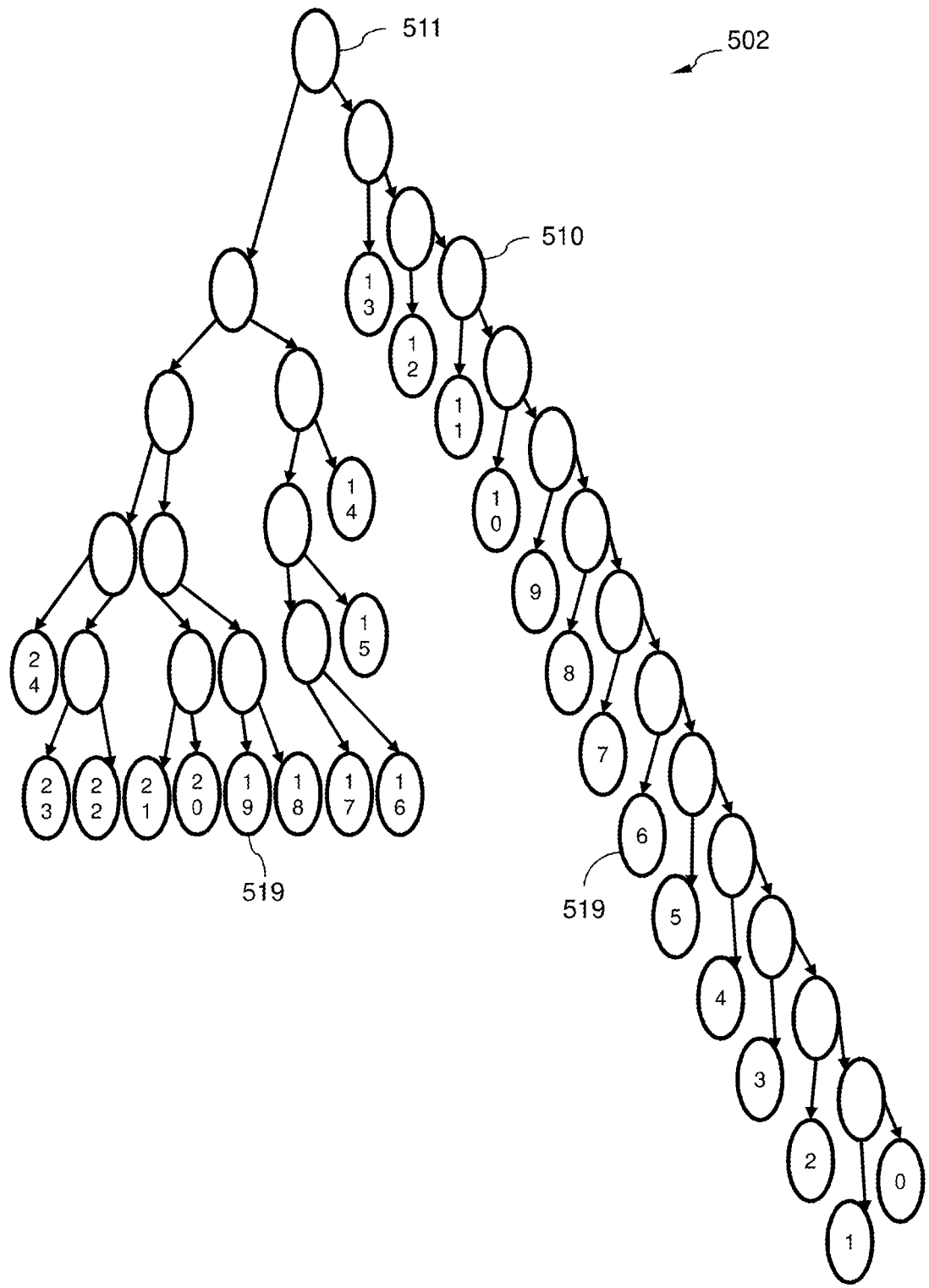

FIG. 10B shows a neuro-binary coding tree 502 for encoding 24 bit raw binary numbers into 14 bit encoded binary numbers at a low qn/sn ratio.

Figure 10C:
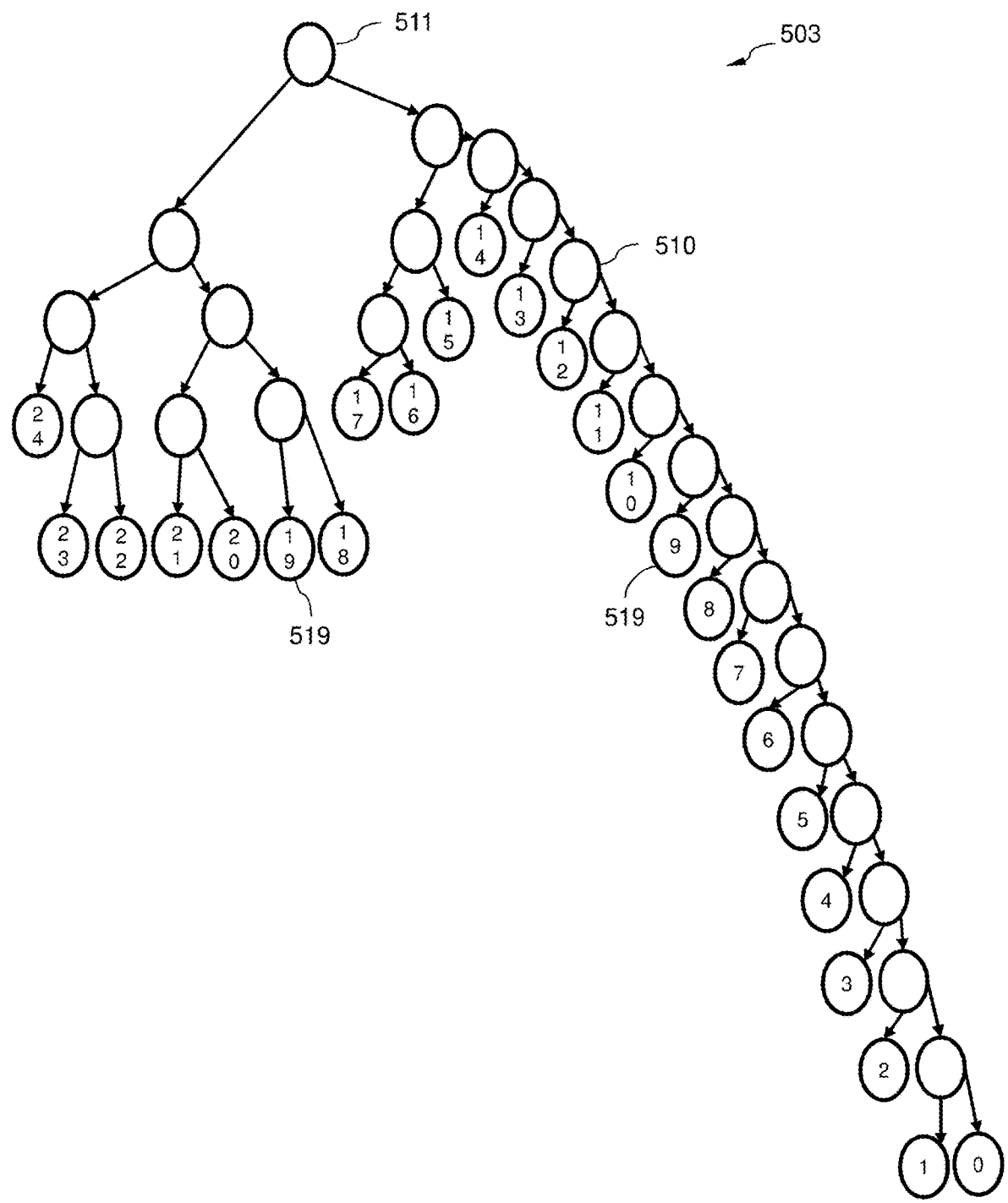

FIG. 10C shows a neuro-binary coding tree 503 for encoding 24 bit raw binary numbers into 16 bit encoded binary numbers at a low qn/sn ratio.

Figure 10D:
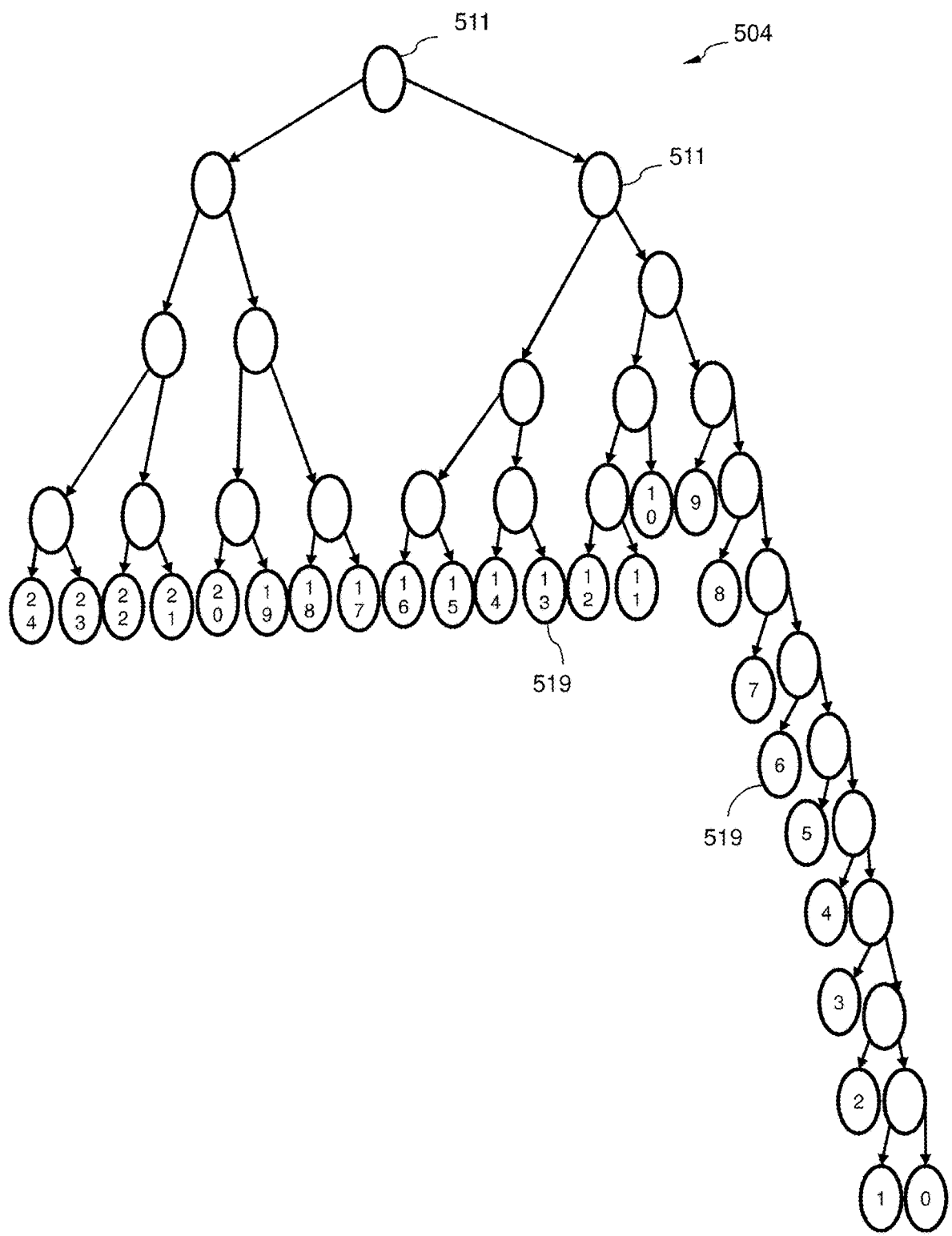

FIG. 10D shows a suitable neuro-binary coding tree 504 for encoding 24 bit raw binary numbers into 12 bit encoded binary numbers for a low quantization error. The neuro-binary coding tree 504 may be used if the absolute quantization error is the dominant metric for the overall quality of the compression. For keeping the absolute quantization error low, the "leaves" 510 in the dendrite portion may be "lifted", e.g. approximately uniformly. In other words, the code lengths of the binary position information may be equal for all hsb positions in an upper section of the raw binary number, e.g. at least for all hsb positions in the upper third or for all hsb positions in the upper half of the raw binary number.

The neuro-binary coding trees 501, 502, 503, 504 of FIG. 10A to 10D are adapted for a coding using the sub-lsb as described with reference to FIGS. 8 and 9 and may be used and/or optimized for coding without considering the sub-lsb (FIGS. 4 to 7B) as well.

Figure 11:
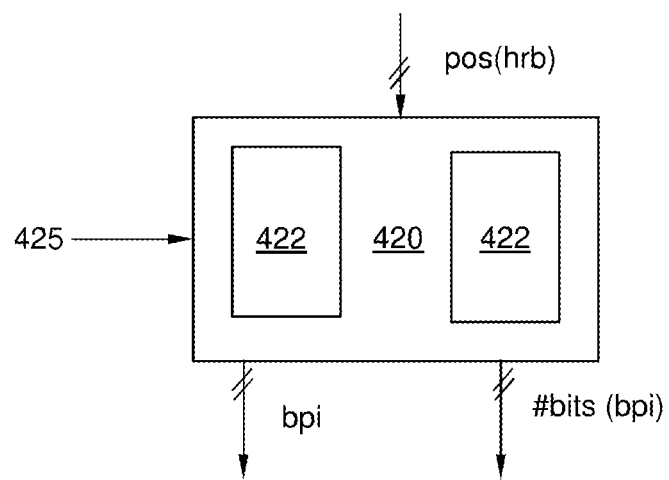
FIG. 11 is a block diagram of a configurable functional block of a data compression device according to an embodiment.

FIG. 11 shows an embodiment of the second functional block 420 that holds instances of more than one code table 422 usable by a data compression device 400. The code tables 422 may differ with respect to the number of bits of the encoded binary number and/or with respect to the desired main characteristic of the compression, such as low absolute quantization error or low ratio between quantization noise and photo shot noise.

The functional block 420 may select one of the code tables 422 in response to a configuration signal 425. The configuration signal 425 may be one-time programmable signal, selected e.g. by fusing an electric fuse or setting a wire connection. Alternatively or in addition, the configuration signal 425 may be a signal transmitted to the data compression device 400 through an electronic signal interface, wherein a processing unit data-linked to the data compression device 400 may select the code table 422 in response to a condition set by the environment and/or by a user.

Figure 12:
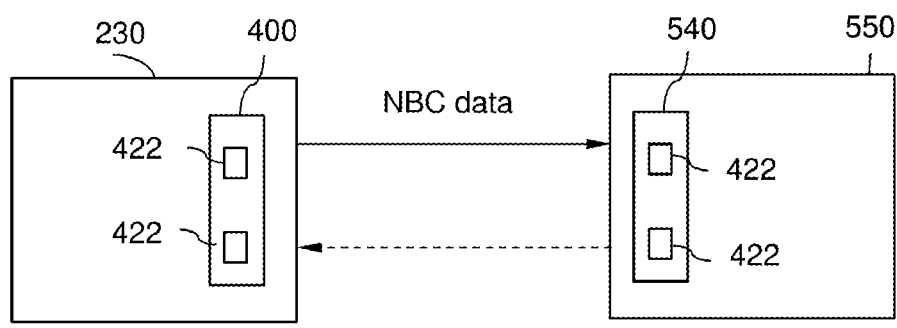
FIG. 12 is a block diagram of an electric system for the transfer of compressed data according to an embodiment.

FIG. 12 shows an electronic system including a data compression device 400 as described above and a data decompression device 540. The data compression device 400 may be integrated in a solid-stage imaging device 230. The data decompression device 540 may be integrated in a data processing apparatus 550.

The data processing apparatus 550 may be any device used for analyzing and/or processing radiation such as visible light, infrared light, ultraviolet light, and X-rays. For example, the data processing apparatus 550 may be any electronic device in the field of traffic, the field of home appliances, the field of medical and healthcare, the field of security, the field of beauty, the field of sports, the field of agriculture, the field of image reproduction or the like.

Specifically, in the field of image reproduction, the data processing apparatus 550 may be a device for capturing an image to be provided for appreciation, such as a digital camera, a smart phone, or a mobile phone device having a camera function. In the field of traffic, for example, the data compression device 400 may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the data compression device 400 may be integrated in any type of sensor, e.g. a solid-state image device, that can be used in devices provided for home appliances such as TV receivers, refrigerators, and air conditioners to capture gestures of users and perform device operations according to the gestures.

Accordingly the data decompression device 540 may be integrated in home appliances such as TV receivers, refrigerators, and air conditioners and/or in devices controlling the home appliances. Furthermore, in the field of medical and healthcare, the data compression device 400 may be integrated in any type of sensor, e.g. a solid-state image device, provided for use in medical and healthcare, such as an endoscope or a device that performs angiography by receiving infrared light.

In the field of security, the data compression device 400 can be integrated in a device provided for use in security, such as a monitoring camera for crime prevention or a camera for person authentication use. Furthermore, in the field of beauty, the data compression device 400 can be used in a device provided for use in beauty, such as a skin measuring instrument that captures skin or a microscope that captures a probe. In the field of sports, the data compression device 400 can be integrated in a device provided for use in sports, such as an action camera or a wearable camera for sport use or the like. Furthermore, in the field of agriculture, the data compression device 400 can be used in a device provided for use in agriculture, such as a camera for monitoring the condition of fields and crops.

The data decompression device 540 may include means for receiving an encoded binary number comprising a second predefined number m1 of bits, wherein the encoded binary number includes a binary value and binary position information of variable length. The data decompression device 540 may further include means for identifying, in the encoded binary number, the binary position information and the binary value, e.g., by using code tables 422. The data decompression device 540 may include a second electronic circuit adapted for obtaining, from the binary position information, a target position. The data decompression device 540 may further include means for compiling a decoded binary number that includes a first predefined number n1 of bits, wherein the decoded binary number includes a highest-weighted bit unequal to zero at the target position and the binary value at bit positions following the target position.

The data compression device 400 and the data decompression device 540 may include instances of the same code tables 422. The data compression device 400 and the data decompression device 540 may exchange information identifying the currently used code tables 422.

The data decompression device 540 receives and decodes the encoded binary number compiled by the data compression device 400 and restores the original raw binary numbers.

Figure 13A:
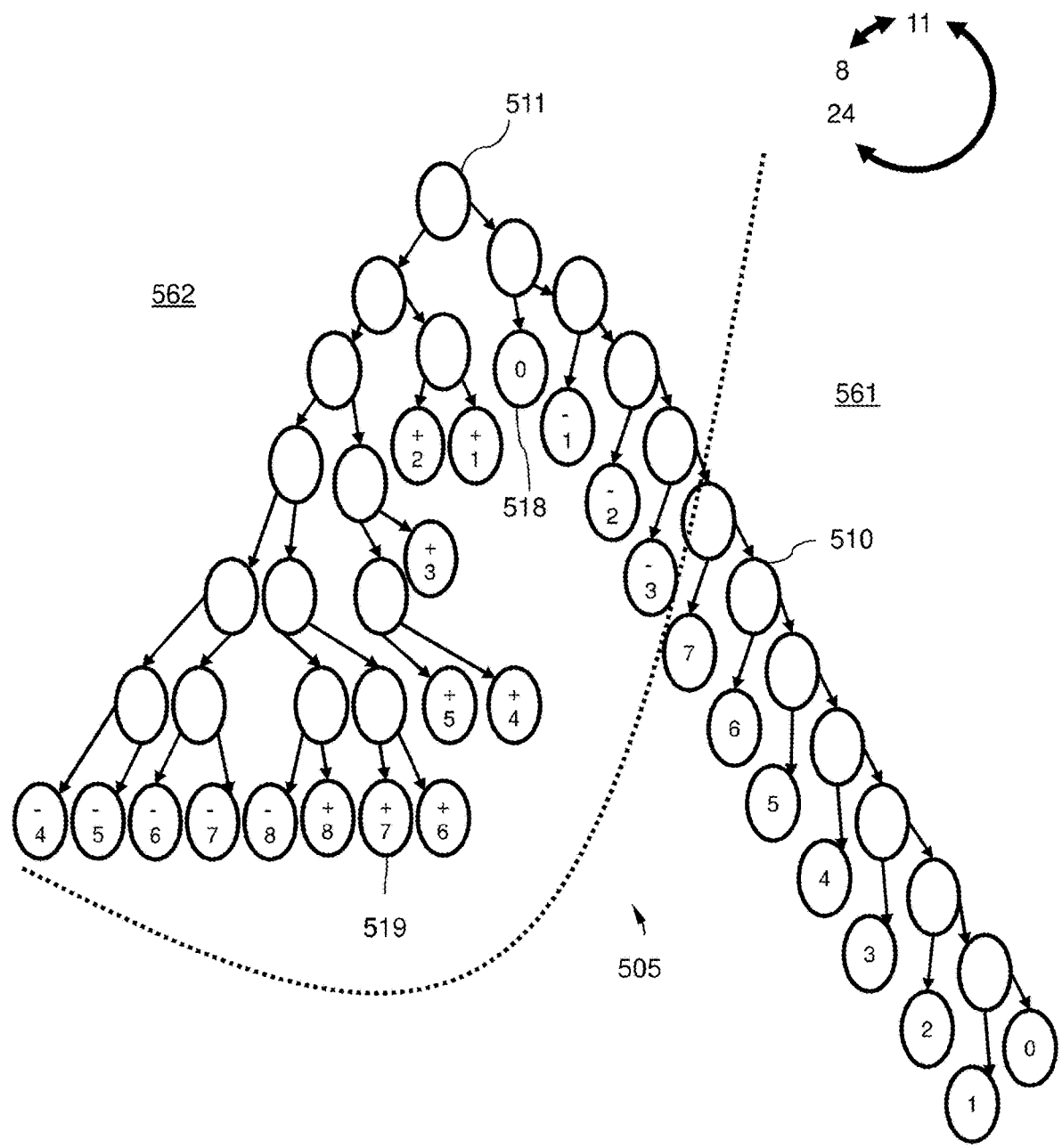
FIGS. 13A-13B show examples of neuro-binary coding trees for discussing effects of differential NBC compression according to an embodiment.
Figure 13B:
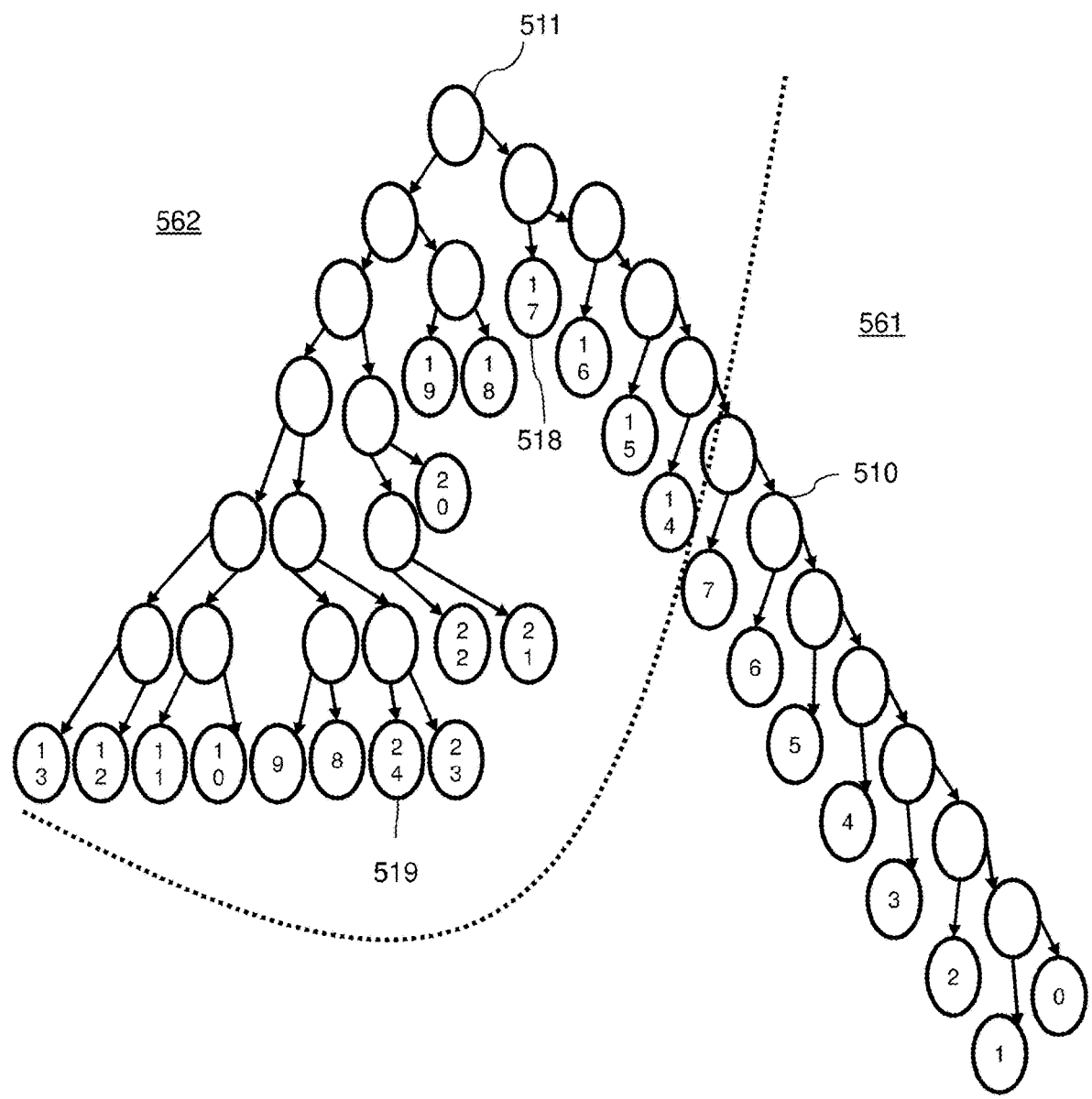

FIGS. 13A and 13B refer to an embodiment concerning a differential NBC method. The differential NBC method tries to encode the binary position information enclosing two or three bits as for bit positions 10, 11, 12 and 13. Since more bits are available for the bits following the hsb position, the quantization error can be reduced.

The differential NBC method uses information taken from another digital pixel data values and may encode only a difference to the other digital pixel data value. The other digital pixel data value may be a neighboring one in temporal and/or spatial respect.

For example, for two temporarily successive digital pixel data values obtained from the same pixel circuit, the encoded binary number of the preceding digital pixel data value may represent a reference value and the encoded binary number of the subsequent digital pixel data value may be obtained by encoding only a difference between the preceding and the subsequent pixel data value.

According to another example, from two digital pixel data values obtained from two spatially neighboring pixel circuits at the same time or at subsequent row reading cycles a first encoded binary number obtained from the first digital pixel data may be encoded to represent a reference value and the second encoded binary number obtained from the second digital pixel data may be obtained by encoding only a difference between the first and the second pixel data value.

The neighboring pixel circuits may be directly adjacent ones in the same row, in the same column, and/or may be assigned to a same color channel, wherein pixel circuits assigned to the same color channel receive light through the same type of color filter, e.g., blue, red, green.

The differential NBC method takes advantage of that in many applications the position of the highest-weighted bit unequal zero does not change often. The differential NBC method may significantly reduce the quantization error with respect to the shot noise and may in many applications show a better noise profile in average.

FIGS. 13A and 13B refer to a neuro-binary coding tree 505 of the base structure as the neuro-binary coding tree 500 in FIG. 7A. For differential NBC, for encoding a second raw binary number following a first raw binary the neuro-binary coding tree 505 is divided into a first region 561 and a second region 562. In the first region 561 the representation of the position of the highest-weighted bit unequal zero is absolute ("absolute hsb representation") and in the second region 562 the representation of the position of the highest-weighted bit unequal zero is relative ("relative hsb representation"). In the second region 562 the numbers in the leaves 519 indicate the shift of the hsb position with respect to the hsb position in the previously encoded raw binary number. Leaf 518 with number "0" marks the hsb position in the previously encoded raw binary number.

FIG. 13B shows the hsb positions when in the previously encoded raw binary number the hsb position has been at bit position 17.

Figure 14:
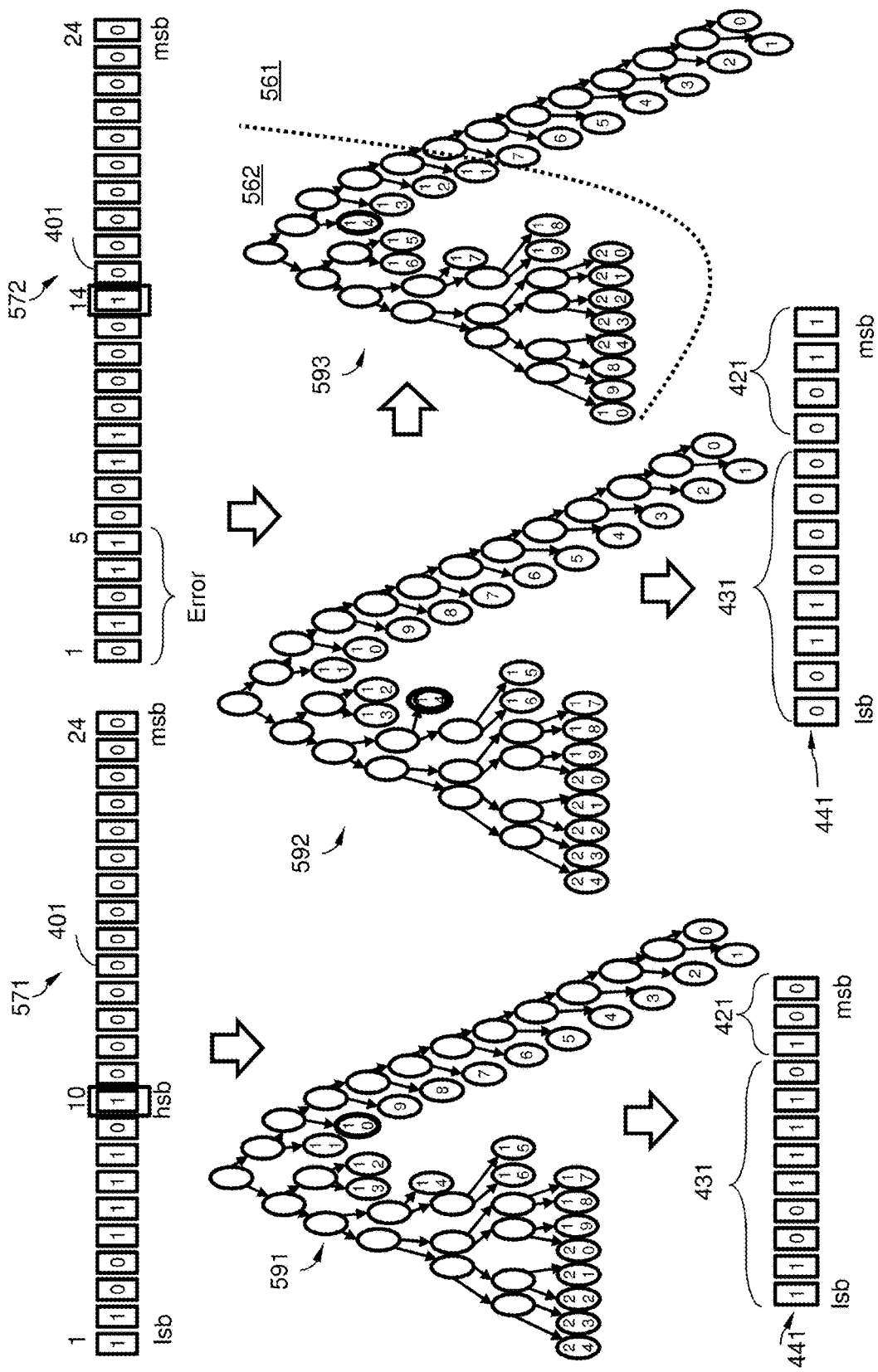
FIGS. 14-16 show further examples of encoding raw binary numbers for discussing effects of differential NBC compression according to another embodiment.
Figure 15:
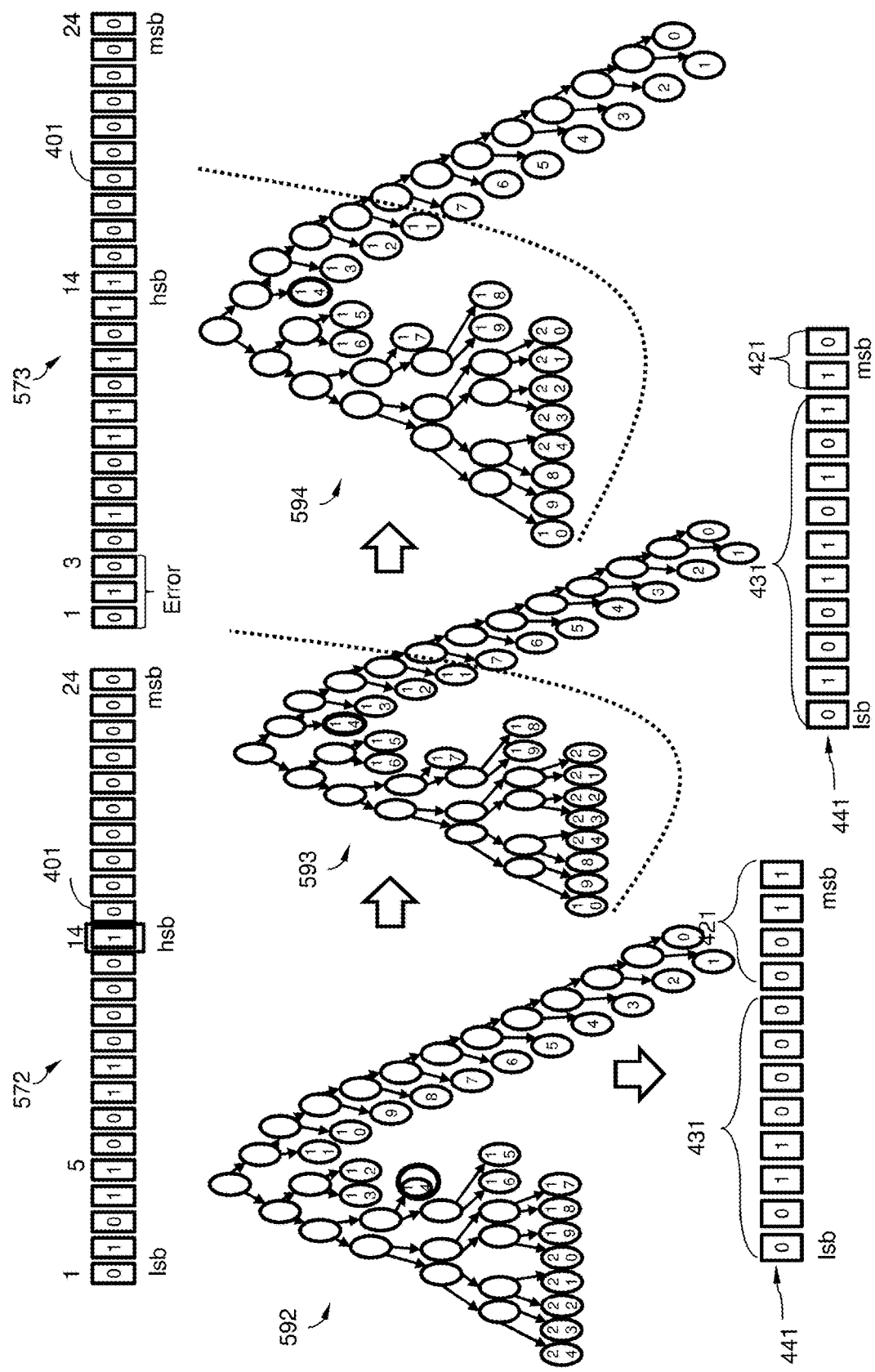
Figure 16:
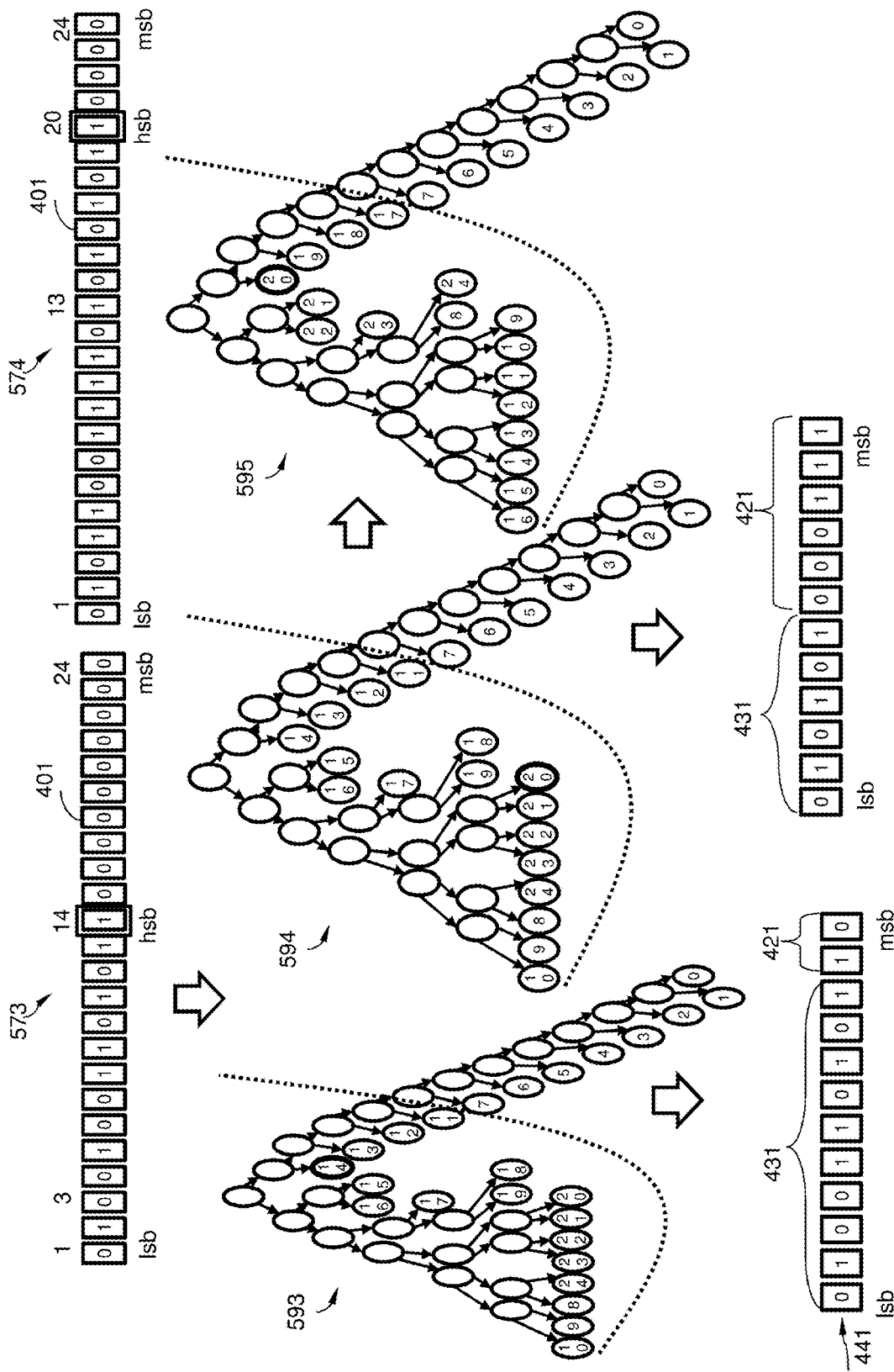

FIGS. 14 to 16 show an example of encoding a sequence of raw binary numbers 571, 572, 573, 574. The top most line gives the respective raw binary number 401. The line at the bottom gives the respective encoded binary number 441. In addition, the Figures show the pertinent neuro-binary coding tree 591, 592, 593, 594, 595 applied for obtaining the encoded binary number 441 from the respective raw binary number 401. The base structure of all neuro-binary coding trees 591, 592, 593, 594, 595 is that of the neuro-binary coding tree 500 in FIG. 7A. For simplicity, the examples do not consider the sub-lsb. The first neuro-binary coding tree 591 is equal to the neuro-binary coding tree 500 in FIG. 7A.

In the first raw binary number 571 shown in FIG. 14 the highest-weighted bit hsb unequal zero is at bit position 10 in the axon part of the first neuro-binary coding tree 591. The binary position information contains three bit reading "001" from the msb to the lsb. The encoded binary number 441 contains 3 bit binary position information 421 and the partial binary number 431 containing the nine bits following the hsb in the first raw binary number 371.

If in the first raw binary number 571 the hsb position is less than 11, then the operation of the differential NBC method is the same as for the non-differential NBC method. Accordingly, the second neuro-binary coding tree 592 for encoding the second raw binary number 572 is the same as that for encoding the first raw binary number 571.

In the second raw binary number 572 the highest-weighted bit hsb unequal zero is at bit position 14 in the dendrite part of the neuro-binary coding tree 592. The binary position information contains four bit reading "1100" from the msb to the lsb. The encoded binary number 441 contains the 4 bit binary position information 421 and the partial binary number 431 containing the eight bits following the hsb in the second raw binary number 572. The six least significant bits of the second raw binary number 572 get lost.

In addition, the neuro-binary coding tree is redefined in that way that the end leaves 519 of the decision paths stand for other hsb positions. In particular, the neuro-binary coding tree is changed such that the current hsb position (bit position 14) is encoded with bit position information having a small code length of at most three bits. In the illustrated embodiment, the third neuro-binary coding tree 593 is defined to encode the current hsb position (bit position 14) with only two bits. The further possible hsb positions are encoded in a way that small deviations from the hsb position in the second raw binary number 572 need only few additional code bits. In the illustrated embodiment the close hsb positions 13, 15 and 16 are encoded with only three bits.

FIG. 15 shows the encoding of a third raw binary number 573 with the adapted third neuro-binary coding tree 593. In the third raw binary number 573 the highest-weighted bit hsb unequal zero is at bit position 14. By using the third neuro-binary coding tree 593, the binary position information contains two bits reading "01" from the msb to the lsb. The encoded binary number 441 contains the 2 bit binary position information 421 and the partial binary number 431 containing the ten bits following the hsb in the third raw binary number 573. Only the three least significant bits of the third raw binary number 573 get lost and the quantization error for the third raw binary number 573 is significantly reduced compared to the quantization error for the second raw binary number 572.

Since the third binary number 573 is encoded with the shortest possible binary position information, the neuro-binary coding tree 593 may remain unchanged and the fourth neuro-binary coding tree 594 used for a subsequent fourth raw binary number is equal to the third neuro-binary coding tree 593.

FIG. 16 shows the fourth raw binary number 574 encoded using the fourth neuro-binary coding tree 594. In the fourth raw binary number 574 the highest-weighted bit hsb unequal zero is at bit position 20. The binary position information contains six bits reading "111000" from the msb to the lsb. The encoded binary number 441 contains the 6 bit binary position information 421 and the partial binary number 431 containing the six bits following the hsb in the fourth raw binary number 574. The thirteen least significant bits of the fourth raw binary number 574 get lost.

The neuro-binary coding tree is again redefined in that way that that the current hsb position (bit position 20) is encoded with bit position information having the smallest possible code length of two bits. The further possible hsb positions are encoded in a way that small deviations from the hsb position in the fourth raw binary number 574 need only few additional code bits. In the illustrated embodiment the close hsb positions 19, 21 and 22 are encoded with only three bits.

Figure 17:
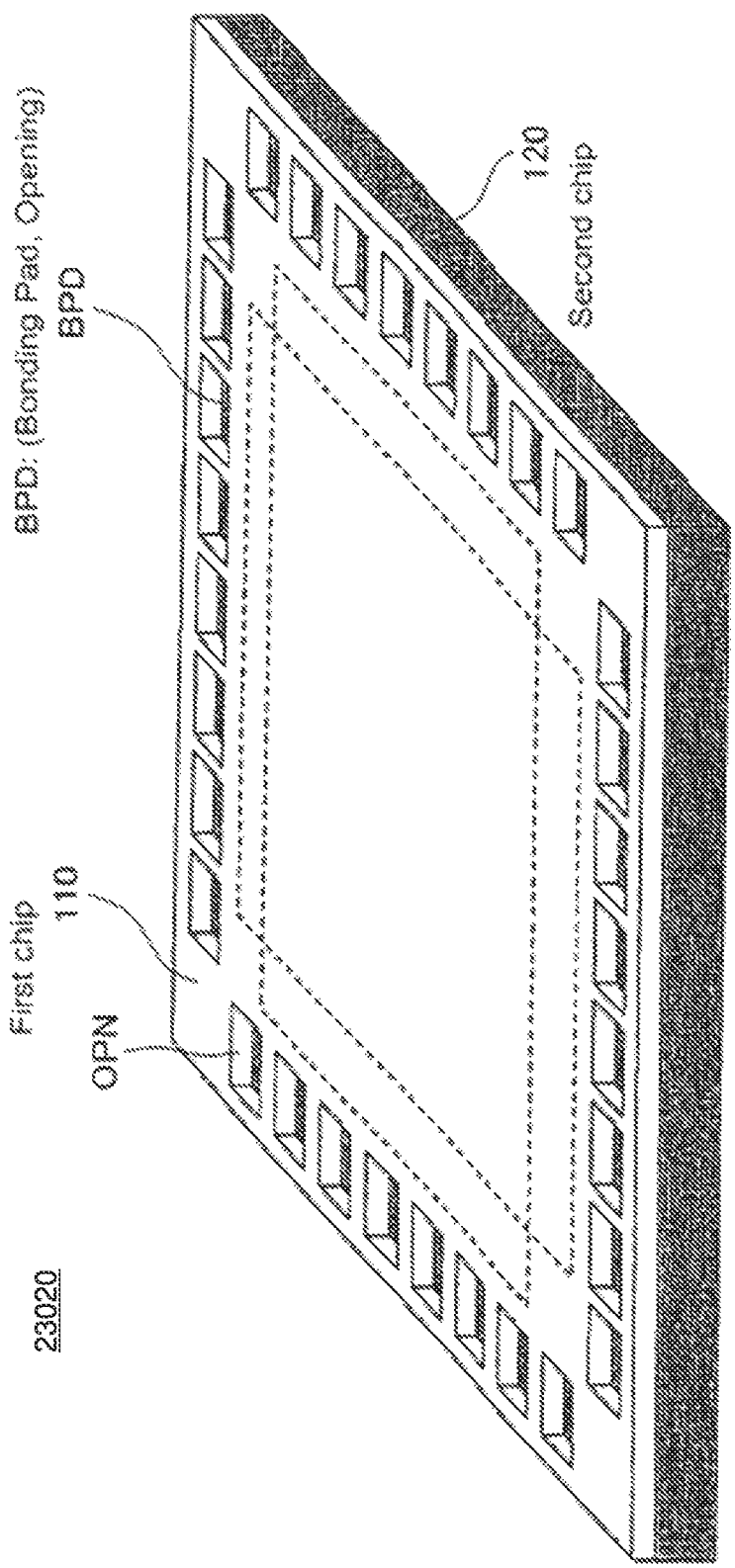
FIG. 17 is a diagram showing an example of the laminated structure of a solid-state imaging device according to an embodiment of the present disclosure.

FIG. 17 is a perspective view showing an example of a laminated structure of a solid-state imaging device 23020 with a plurality of pixel circuits arranged matrix-like in array form. Each pixel circuit has at least one photoelectric conversion element.

The solid-state imaging device 23020 has the laminated structure of a first chip (upper chip) 110 and a second chip (lower chip) 120.

The laminated first and second chips 110 and 120 may be electrically connected to each other through TC(S)Vs (Through Contact (Silicon) Vias) formed in the first chip 110.

The solid-state imaging device 23020 may be formed to have the laminated structure in such a manner that the first and second chips 110 and 120 are bonded together at a wafer level and cut out by dicing.

In the laminated structure of the upper and lower two chips, the first chip 110 may be an analog chip (sensor chip) including at least one analog component of each pixel circuit, e.g., the photoelectric conversion elements arranged in array form. For example, the first chip 110 may include only the photoelectric conversion elements. Alternatively, the first chip 110 may include, in addition to the photoelectric conversion element one, two, three or four of the active elements (transfer transistor TG, reset transistor RST, amplification transistor AMO, and selection transistor SEL) of each pixel circuit.

The first chip 110 may also include logic circuits. For example, the first chip 110 may include portions of the ADC, e.g. at least one of the comparator 23, the counter 24, the current source 21 and the DAC 22, may include parts of the comparator 23, or may include the complete ADC as illustrated in FIG. 4 for each column of pixel circuits. The first chip 110 may also include at least portions of the address decoder 12, the pixel timing driving unit 13 and the sensor controller 15 and/or at least portions of the signal processing circuit 19 as illustrated in FIG. 1.

The second chip 120 may be mainly a logic chip (digital chip) that includes the elements complementing the circuits on the first chip 110 to the solid-state imaging device 23020. The second chip 120 may also include analog circuits, for example circuits that quantize analog signals transferred from the first chip 110 through the TCVs and to a signal processing circuit.

The second chip 120 may have one or more bonding pads BPD and the first chip 110 may have openings OPN for use in wire-bonding to the second chip 120.

The solid-state imaging device 23020 with the laminated structure of the two chips 110, 120 may have the following characteristic configuration.

The electrical connection between the first chip 110 and the second chip 120 is performed through, for example, the TCVs.

The TCVs may be arranged at chip ends or between a pad region and a circuit region.

The TCVs for transmitting control signals and supplying power are mainly concentrated at, for example, the four corners of the solid-state imaging device 23020, by which a signal wiring area of the first chip 110 can be reduced.

A reduction in the number of the wiring layers of the first chip 110 may result in an increase in the resistance of a power supply line and an increase in IR-Drop. As countermeasures for this problem, the effective arrangement of the TCVs can improve the noise control, stable supply, or the like of a power supply in the first chip 110 using the wiring of the second chip 120.

Figure 18:
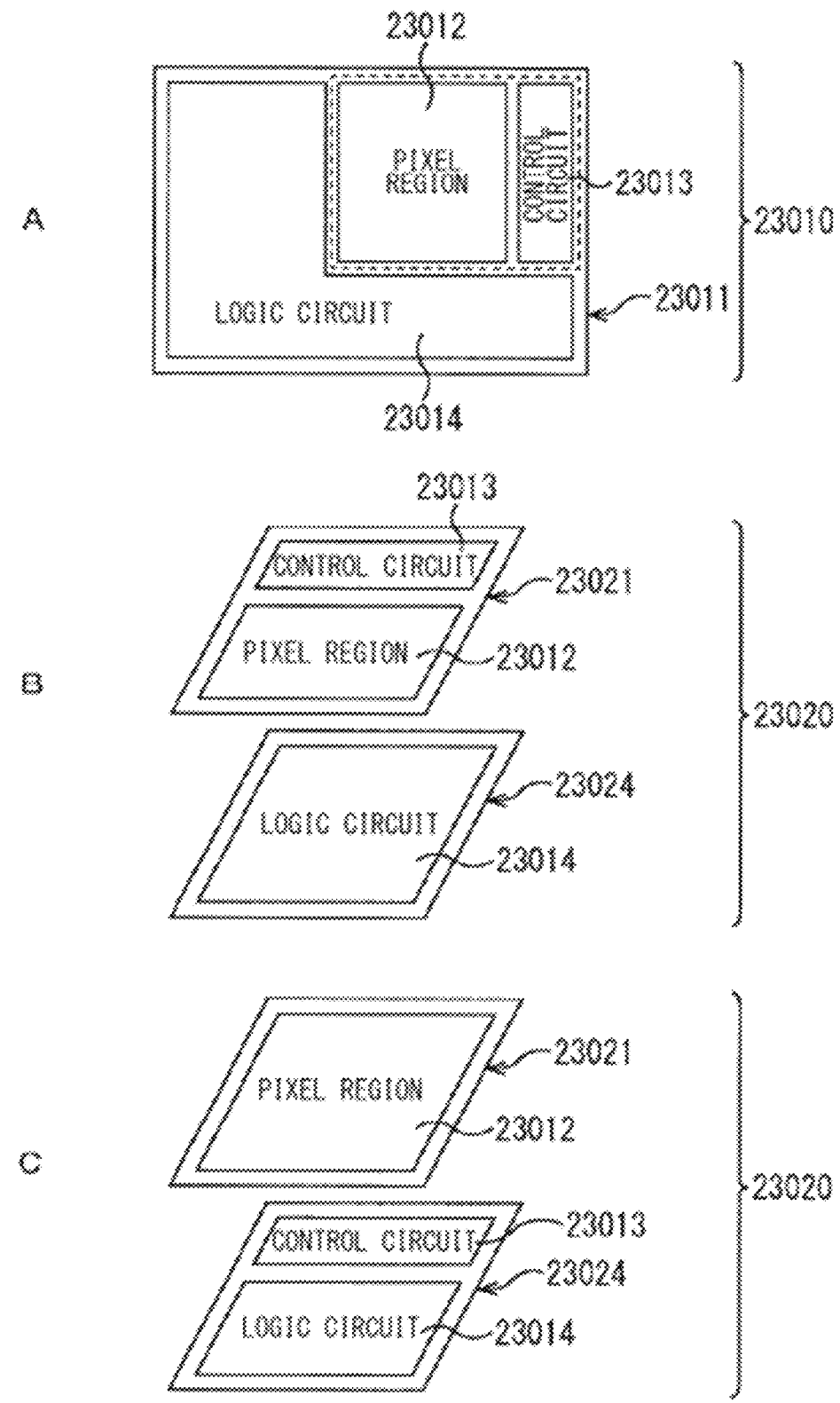
FIG. 18 illustrates an overview of a configuration example of a multi-layer solid-state imaging device to which a technology according to the present disclosure may be applied.

FIG. 18 illustrates schematic configuration examples of solid-state imaging devices 23010, 23020.

The single-layer solid-state imaging device 23010 illustrated in A of FIG. 18 includes a single die (semiconductor substrate) 23011. Mounted and/or formed on the die 23011 are a pixel region 23012 (pixel array unit), a control circuit 23013 (address decoder, pixel timing driving unit, sensor controller), and a logic circuit 23014 (ADC, Latches). In the pixel region 23012, pixels (pixel circuits) are disposed in an array form. The control circuit 23013 performs various kinds of control including control of driving the pixels. The logic circuit 23014 performs signal processing.

B and C of FIG. 18 illustrate schematic configuration examples of multi-layer solid-state imaging devices 23020. As illustrated in B and C of FIG. 18, two dies (chips), namely a sensor die 23021 (first chip) and a logic die 23024 (second chip), are stacked in a solid-state imaging device 23020. These dies are electrically coupled to form a single semiconductor chip.

With reference to B of FIG. 18, the pixel region 23012 and the control circuit 23013 are formed or mounted on the sensor die 23021, and the logic circuit 23014 is formed or mounted on the logic die 23024. The logic circuit 23014 includes a signal processing circuit 19 that processes signals, e.g. a data compression device as described above.

With reference to C of FIG. 18, the pixel region 23012 is formed or mounted on the sensor die 23021, whereas the control circuit 23013 and the logic circuit 23014 are formed or mounted on the logic die 23024.

According to another example (not illustrated), the pixel region 23012 and the logic circuit 23014, or the pixel region 23012 and parts of the logic circuit 23014 may be formed or mounted on the sensor die 23021, and the control circuit 23013 is formed or mounted on the logic die 23024.

Figure 19:
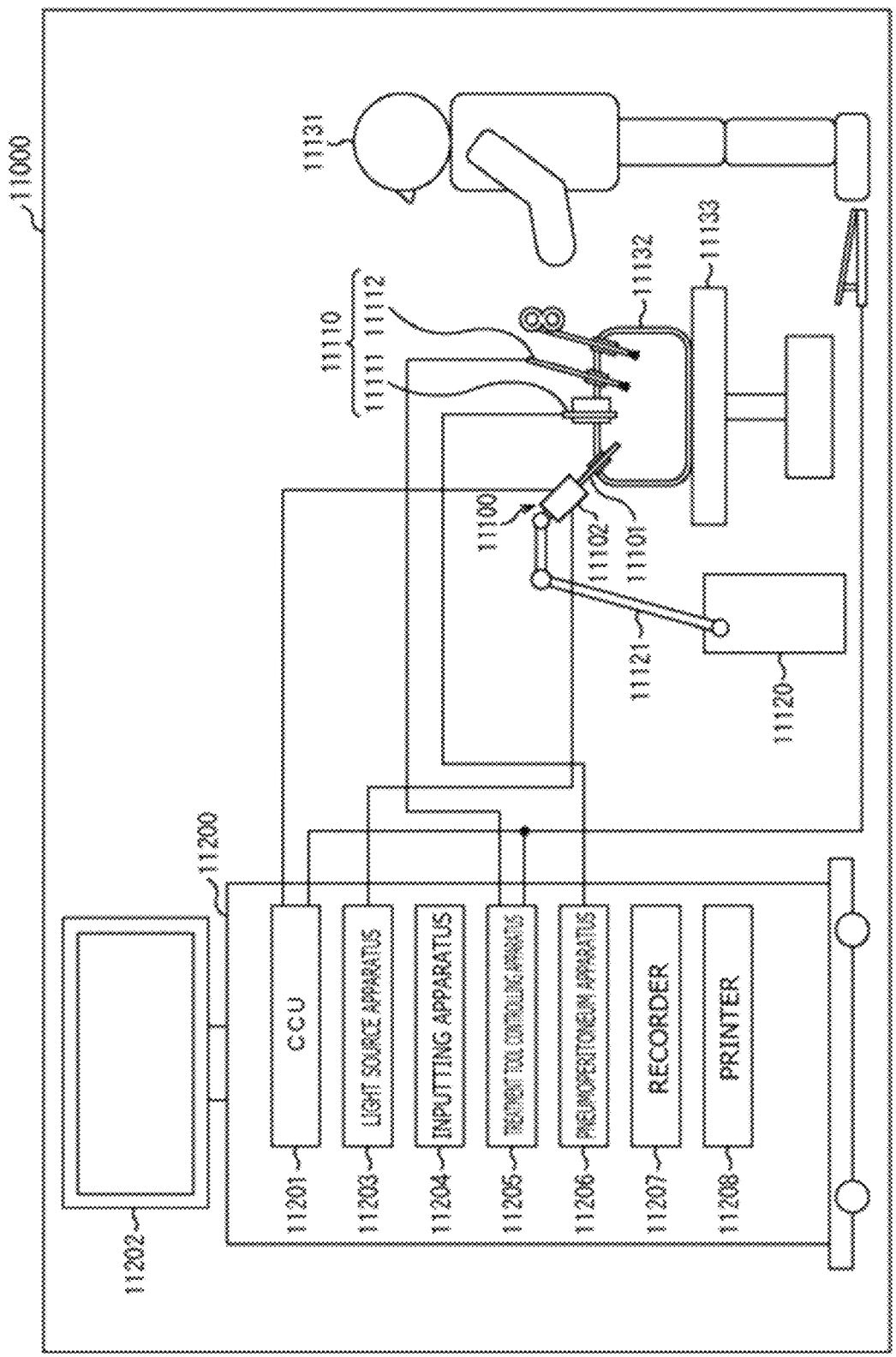
FIG. 19 is a view depicting an example of a schematic configuration of an endoscopic surgery system.

FIG. 19 is a view depicting an example of a schematic configuration of an endoscopic surgery system to which the technology according to an embodiment of the present disclosure (present technology) can be applied.

In FIG. 19, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element (solid-state imaging device) are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201. The image signal may include NBC compressed data, by way of example.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process). The CCU 11201 may include a data decompression device configured to decompress NBC compressed data, wherein the CCU 11201 may execute a program code for performing a data decompression method according to the present disclosure.

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

The example of the endoscopic surgery system to which the technology according to an embodiment of the present disclosure is applied has been described above. For example, by applying the NBC data compression according the present disclosure for the image data transmitted from a solid-state imaging device in the camera head 11102 to the CCU 11201, it is may be possible to improve the signal-to-noise ratio for the date transmission, by way of example.

<Application Example to Mobile Body>

The technology according to the present disclosure may also be realized as a device mounted in a mobile body of any type such as automobile, electric vehicle, hybrid electric vehicle, motorcycle, bicycle, personal mobility, airplane, drone, ship, or robot.

Figure 20:
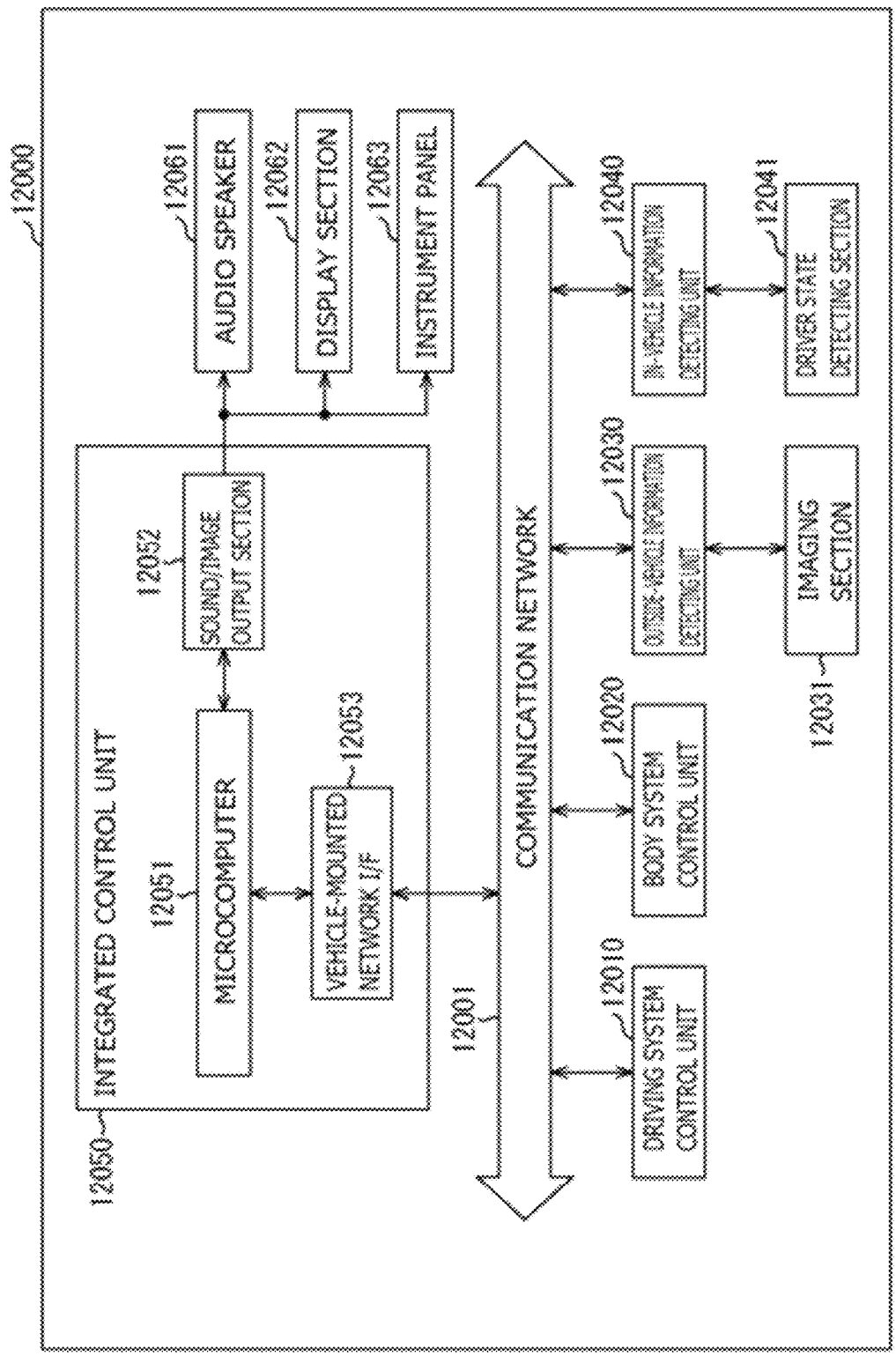
FIG. 20 is a block diagram depicting an example of a schematic configuration of a vehicle control system.

FIG. 20 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 29, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an on-board display or a head-up display.

Figure 21:
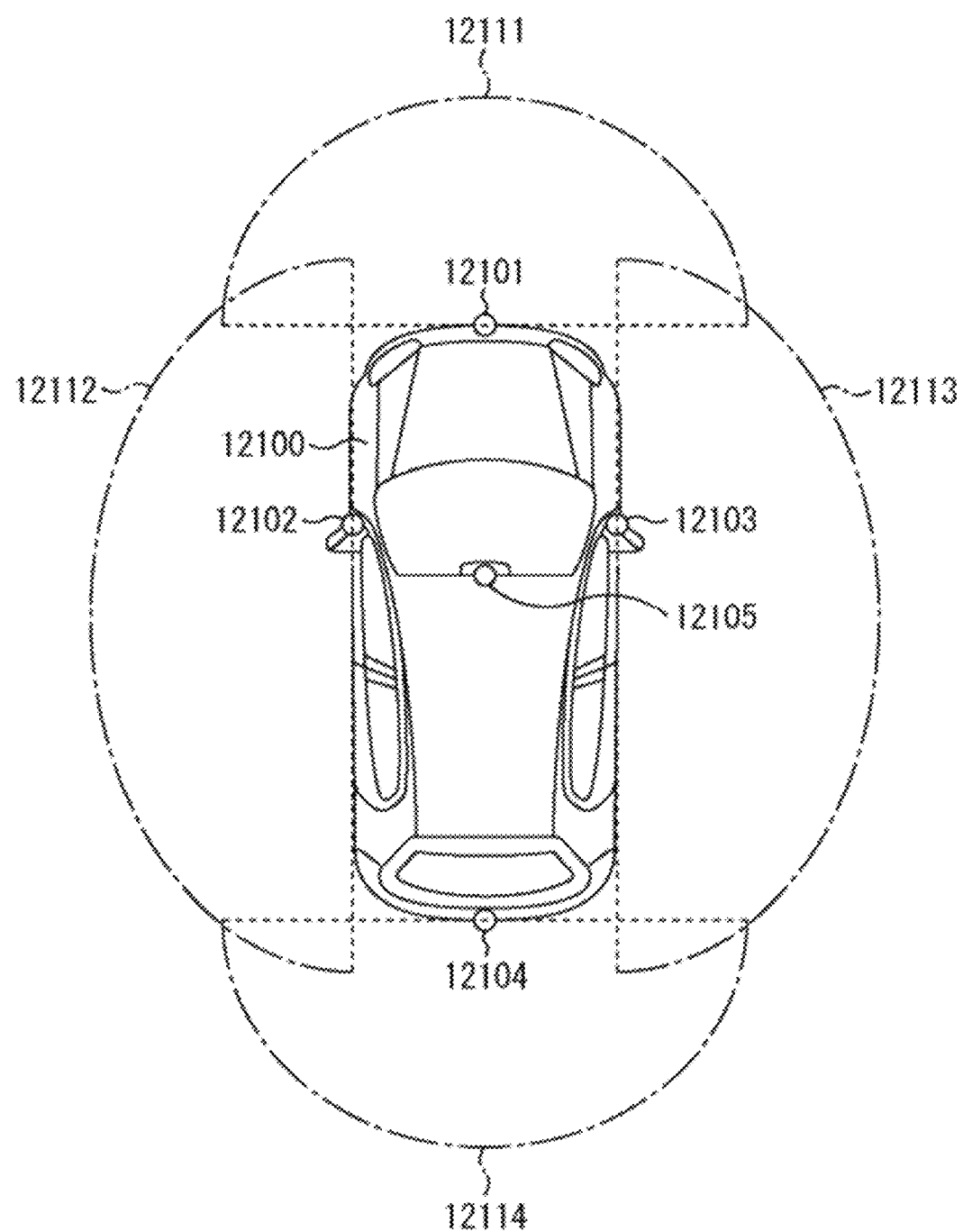
FIG. 21 is a diagram of assistance in explaining an example of installation positions of an outside-vehicle information detecting section and an imaging section of the vehicle control system of FIG. 20.

FIG. 21 is a diagram depicting an example of the installation position of the imaging section 12031.

In FIG. 21, the imaging section 12031 includes imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 21 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying the NBC data compression according the embodiments for the image data transmitted through the communication network it is possible to reduce power consumption without adversely affecting driving support.

Additionally, embodiments of the present technology are not limited to the above-described embodiments, but various changes can be made within the scope of the present technology without departing from the gist of the present technology.

Note that the present technology can also be configured as described below:

(1) A data compression method, the method including receiving a raw binary number including a first predefined number n1 of bits, each bit representing either zero or $2(n-1)$ with n representing a position of the bit in the binary number and $1 \leq n \leq n1$;

identifying, in the raw binary number, a position of a highest-weighted bit unequal zero; generating, by using a first electronic circuit (491), binary position information by encoding the identified position; and compiling an encoded binary number, wherein the encoded binary number is based on the binary position information and on a partial binary number being a portion of the raw binary number directly following the highest-weighted bit unequal zero, and wherein the encoded binary number includes a second predefined number m1 of bits, wherein the second predefined number m1 of bits is smaller than the first predefined number n1 of bits.

(2) The data compression method according to (1), wherein the encoded binary number is compiled to include the binary position information and a copy of the portion of the raw binary number directly following the highest-weighted bit unequal zero.

(3) The data compression method according to any of (1) and (2), wherein, if a difference between the second number m1 of bits and a number k of bits representing the binary position information is smaller than a number of bits in the raw binary number from and including a least significant bit to and excluding the highest-weighted bit unequal zero, a rounded binary number is obtained by increasing by one an auxiliary binary number obtained by expanding the partial binary number by a next less significant bit and then truncating, by one bit, the increased auxiliary binary number, and wherein the encoded binary number contains the binary position information and a copy of the truncated auxiliary binary number.

(4) The data compression method according to (3), wherein a variable number k of bits used for the binary position information is selected depending on the position of the highest-weighted bit unequal zero in the raw binary number.

(5) The data compression method according to any of (1) to (4), wherein, if in the raw binary number the position x of the highest-weighted bit unequal zero is lower than m0, with m0<m1, for each position m with $1 \leq m \leq m0$, the m-th bit in the encoded binary number is set equal to a corresponding m-th bit of the raw binary number.

(6) The data compression method according to any of (1) to (5), wherein the binary position information includes a first number k1 of bits if in the raw binary number the highest-weighted bit unequal zero is the most significant bit of the raw binary number, wherein the binary position information includes a second number k2 of bits if in the raw binary number all but the least significant bit are equal zero, and wherein the binary position information includes a number of bits lower than the first number k1 and lower than the second number k2 if in the raw binary number a position of the highest-weighted bit is in a predefined range between the least significant bit and the most significant bit.

(7) The data compression method according to (6), wherein for at least one position p3 in a range from p1 to p2 the binary position information includes a minimum number k3 of bits, and wherein if in a first raw binary number the highest-weighted bit unequal zero is between p3 and the most significant bit and if in a subsequently processed second raw binary number the highest-weighted bit unequal zero is between p3 and the most significant bit, the binary position information encodes a differential information descriptive for a distance in bit positions between the highest-weighted bit unequal zero in the first raw binary number and the highest-weighted bit unequal zero in the second raw binary number.

(8) The data compression method according to any of (1) to (7), wherein the binary position information includes a first number k1 of bits if in the raw binary number the highest-weighted bit unequal zero is any of n3 most significant bits of the raw binary number, wherein $INT((m1)/2) \leq n3 \leq ((m1)-2))$.

(9) The data compression method according to any of (1) to (8), wherein a median of a length histogram of a neuro-binary coding tree representing the decoding is smaller than the binary logarithm of the integer value of half of the second number of bits m1.

(10) A data decompression method, the method including:

receiving an encoded binary number including a second predefined number m1 of bits, wherein the encoded binary number includes a binary value and binary position information of variable length;

identifying, in the encoded binary number, the binary position information and the binary value;

obtaining, by using a second electronic circuit, a target position from the binary position information;

compiling a decoded binary number including a first predefined number n1 of bits, wherein the decoded binary number includes a highest-weighted bit unequal to zero at the target position and the binary value at bit positions following the target position.

(11) A data transmission method, the method including encoding, in a first electronic device, a raw binary number by using the data compression method according to any of (1) to (9) to obtain an encoded binary number;

transmitting the encoded binary number from the first electronic device to a second electronic device; and decoding, in the second electronic device, the encoded binary number by using the data decompression method according to (10) to obtain a decoded binary number, wherein the decoded binary number is identical to the raw binary number for low values and approximates the raw binary number for high values.

(12) A data compression device, including:

means for receiving a raw binary number including a first predefined number n1 of bits, each bit representing either zero or $2(n-1)$ with n representing a position of the bit in the binary number and $1 \leq n \leq n1$;

means for identifying, in the raw binary number, a position of a highest-weighted bit unequal zero;

a first electronic circuit configured to encode the identified position to obtain binary position information;

means for compiling an encoded binary number, wherein the encoded binary is based on the binary position information and on a partial binary number being a portion of the raw binary number directly following the highest-weighted bit unequal zero, and wherein the encoded binary number includes a second predefined number of bits m1, wherein the second predefined number m1 of bits is smaller than the first predefined number n1 of bits.

(13) A solid-state imaging device, including a pixel array unit including a plurality of pixel circuits arranged in matrix form, the pixel circuits being configured to perform photoelectric conversion; and
an analog-to-digital converter configured to convert an electric signal corresponding to a charge obtained by the photoelectric conversion in the pixel circuit into digital pixel data; and
a data compression device according to (12), wherein the data compression device is configured to use the digital pixel data as the raw binary number.
(14) The solid-state imaging device according to (13), further including a customary compression unit configured to encode the digital pixel data using a piece-wise linear encoding scheme.
(15) A data decompression device, including:
means for receiving an encoded binary number including a second predefined number m1 of bits, wherein the encoded binary number includes a binary value and binary position information of variable length;
means for identifying, in the encoded binary number, the binary position information and the binary value;
a second electronic circuit adapted for obtaining, from the binary position information, a target position;
means for compiling a decoded binary number including a first predefined number n1 of bits, wherein the decoded binary number includes a highest-weighted bit unequal to zero at the target position and the binary value at bit positions following the target position.
(16) An electronic system including:
the data compression device according to (12); and
the data decompression device according to (15), wherein the data decompression device is configured to receive and decode the encoded binary number compiled by the data compression device.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:
1. A data compression method, the method comprising:
receiving a raw binary number comprising a first predefined number n1 of bits, each bit representing either zero or $2^{(n-1)}$ with n representing a position of the bit in the binary number and $1 \le n \le n1$;
identifying, in the raw binary number, a position of a highest-weighted bit unequal zero;
generating, by using a first electronic circuit, binary position information by encoding the identified position;
compiling an encoded binary number, wherein the encoded binary number is based on the binary position information and on a partial binary number being a portion of the raw binary number directly following the highest-weighted bit unequal zero, and wherein the encoded binary number comprises a second predefined number m1 of bits, wherein the second predefined number m1 of bits is smaller than the first predefined number n1 of bits.

2. The data compression method according to claim 1, wherein the encoded binary number is compiled to comprise the binary position information and a copy of the portion of the raw binary number directly following the highest-weighted bit unequal zero.

3. The data compression method according to claim 1, wherein, if a difference between the second number m1 of bits and a number k of bits representing the binary position information is smaller than a number of bits in the raw binary number from and including a least significant bit to and excluding the highest-weighted bit unequal zero, a rounded binary number is obtained by increasing by one an auxiliary binary number obtained by expanding the partial binary number by a next less significant bit and then truncating, by one bit, the increased auxiliary binary number, and
wherein the encoded binary number contains the binary position information and a copy of the truncated auxiliary binary number.

4. The data compression method according to claim 3, wherein a variable number k of bits used for the binary position information is selected depending on the position of the highest-weighted bit unequal zero in the raw binary number.

5. The data compression method according to claim 1, wherein, if in the raw binary number the position x of the highest-weighted bit unequal zero is lower than m0, with m0<m1, for each position m with $1 \le m \le m0$, the m-th bit in the encoded binary number is set equal to a corresponding m-th bit of the raw binary number.

6. The data compression method according to claim 1, wherein the binary position information comprises a first number k1 of bits if in the raw binary number the highest-weighted bit unequal zero is the most significant bit of the raw binary number,
wherein the binary position information comprises a second number k2 of bits if in the raw binary number all but the least significant bit are equal zero, and
wherein the binary position information comprises a number of bits lower than the first number k1 and lower than the second number k2 if in the raw binary number a position of the highest-weighted bit is in a predefined range between the least significant bit and the most significant bit.

7. The data compression method according to claim 6, wherein for at least one position p3 in a range from p1 to p2 the binary position information comprises a minimum number k3 of bits, and
wherein if in a first raw binary number the highest-weighted bit unequal zero is between p3 and the most significant bit and if in a subsequently processed second raw binary number the highest-weighted bit unequal zero is between p3 and the most significant bit, the binary position information encodes a differential information descriptive for a distance in bit positions between the highest-weighted bit unequal zero in the first raw binary number and the highest-weighted bit unequal zero in the second raw binary number.

8. The data compression method according to claim 1, wherein the binary position information comprises a first number k1 of bits if in the raw binary number the highest-weighted bit unequal zero is any of n3 most significant bits of the raw binary number, wherein $INT((m1)/2) \le n3 \le ((m1)-2))$.

9. The data compression method according to claim 1, wherein a median of a length histogram of a neuro-binary coding tree representing the decoding is smaller than the binary logarithm of the integer value of half of the second number of bits m1.

10. A data decompression method, the method comprising:

receiving an encoded binary number comprising a second predefined number m1 of bits, wherein the encoded binary number comprises a binary value and binary position information of variable length;

identifying, in the encoded binary number, the binary position information and the binary value;

obtaining, by using a second electronic circuit, a target position from the binary position information;

compiling a decoded binary number comprising a first predefined number n1 of bits, wherein the decoded binary number comprises a highest-weighted bit unequal to zero at the target position and the binary value at bit positions following the target position.

11. A data transmission method, the method comprising:

encoding, in a first electronic device, a raw binary number by using the data compression method according to claim 1 to obtain an encoded binary number;

transmitting the encoded binary number from the first electronic device to a second electronic device; and decoding, in the second electronic device, the encoded binary number by using the data decompression method according to claim 10 to obtain a decoded binary number, wherein the decoded binary number is identical to the raw binary number for low values and approximates the raw binary number for high values.

12. A data compression device, comprising:

means for receiving a raw binary number comprising a first predefined number n1 of bits, each bit representing either zero or $2^{(n-1)}$ with n representing a position of the bit in the binary number and $1 \leq n \leq n1$;

means for identifying, in the raw binary number, a position of a highest-weighted bit unequal zero;

a first electronic circuit configured to encode the identified position to obtain binary position information;

means for compiling an encoded binary number, wherein the encoded binary is based on the binary position information and on a partial binary number being a portion of the raw binary number directly following the highest-weighted bit unequal zero, and wherein the encoded binary number comprises a second predefined number of bits m1, wherein the second predefined number m1 of bits is smaller than the first predefined number n1 of bits.

13. A solid-state imaging device, comprising:

a pixel array unit comprising a plurality of pixel circuits arranged in matrix form, the pixel circuits being configured to perform photoelectric conversion; and an analog-to-digital converter configured to convert an electric signal corresponding to a charge obtained by the photoelectric conversion in the pixel circuit into digital pixel data; and a data compression device according to claim 12, wherein the data compression device is configured to use the digital pixel data as the raw binary number.

14. The solid-state imaging device according to claim 13, further comprising:

a customary compression unit configured to encode the digital pixel data using a piece-wise linear encoding scheme.

15. A data decompression device, comprising:

means for receiving an encoded binary number comprising a second predefined number m1 of bits, wherein the encoded binary number comprises a binary value and binary position information of variable length;

means for identifying, in the encoded binary number, the binary position information and the binary value;

a second electronic circuit adapted for obtaining, from the binary position information, a target position;

means for compiling a decoded binary number comprising a first predefined number n1 of bits, wherein the decoded binary number comprises a highest-weighted bit unequal to zero at the target position and the binary value at bit positions following the target position.

* * * * *